United States Patent
Myung et al.

(10) Patent No.: US 11,122,632 B2
(45) Date of Patent: Sep. 14, 2021

(54) METHOD FOR ADJUSTING SIZE OF CONTENTION WINDOW IN WIRELESS COMMUNICATION SYSTEM, AND COMMUNICATION DEVICE USING METHOD

(71) Applicant: LG Electronics Inc., Seoul (KR)

(72) Inventors: Sechang Myung, Seoul (KR); Seonwook Kim, Seoul (KR); Changhwan Park, Seoul (KR); Joonkui Ahn, Seoul (KR); Suckchel Yang, Seoul (MN)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/924,626

(22) Filed: Jul. 9, 2020

(65) Prior Publication Data

US 2020/0344819 A1 Oct. 29, 2020

Related U.S. Application Data

(63) Continuation of application No. PCT/KR2019/001711, filed on Feb. 12, 2019.
(Continued)

(30) Foreign Application Priority Data

May 18, 2018 (KR) .................. 10-2018-0057006
Sep. 21, 2018 (KR) .................. 10-2018-0114473

(51) Int. Cl.
*H04L 12/28* (2006.01)
*H04W 74/08* (2009.01)
(Continued)

(52) U.S. Cl.
CPC ....... *H04W 74/0841* (2013.01); *H04L 5/0055* (2013.01); *H04W 72/042* (2013.01); *H04W 72/0453* (2013.01); *H04W 88/08* (2013.01)

(58) Field of Classification Search
CPC ....... H04W 16/14; H04L 5/0055; H04L 1/187
(Continued)

(56) References Cited

U.S. PATENT DOCUMENTS 10,206,223 B2 * 2/2019 Belghoul .............. H04L 1/1887
2017/0055296 A1 2/2017 Cheng et al.
(Continued)

FOREIGN PATENT DOCUMENTS

| WO | WO2016182356 | 11/2016 |
|---|---|---|
| WO | 2017/030417 | 2/2017 |

OTHER PUBLICATIONS

Huawei, HiSilicon, Autonomous uplink access on LBT, R2-1708892, 3GPP TSG-RAN2 Meeting #99, Berlin, Germany, Aug. 21-25, 2017, 3 pages.
(Continued)

*Primary Examiner* — John Pezzlo
(74) *Attorney, Agent, or Firm* — Fish & Richardson P.C.

(57) ABSTRACT

The present disclosure suggests a method for adjusting the size of a contention window of a base station/terminal. The method comprises transmitting a physical downlink shared channel (PDSCH) to a user equipment (UE) through a frequency bandwidth, receiving an acknowledgement/negative-acknowledgement (ACK/NACK) signal for the PDSCH from the UE, and adjusting the contention window based on the ACK/NACK signal, wherein based on the frequency bandwidth overlapping with a plurality of frequency bands, the BS adjusts the contention window for each of the plurality of frequency bands based on the ACK/NACK signal.

12 Claims, 22 Drawing Sheets

Related U.S. Application Data

(60) Provisional application No. 62/629,689, filed on Feb. 12, 2018, provisional application No. 62/668,765, filed on May 8, 2018.

(51) Int. Cl.
  *H04L 5/00* (2006.01)
  *H04W 72/04* (2009.01)
  *H04J 1/16* (2006.01)
  *H04W 88/08* (2009.01)

(58) Field of Classification Search
  USPC .......................................... 370/252, 329, 445
  See application file for complete search history.

(56) References Cited

U.S. PATENT DOCUMENTS

| | | | | |
|---|---|---|---|---|
| 2017/0086225 A1* | 3/2017 | Ljung | .................. | H04B 17/318 |
| 2017/0142751 A1 | 5/2017 | Liu et al. | | |
| 2018/0115981 A1 | 4/2018 | Kim et al. | | |
| 2019/0045489 A1* | 2/2019 | He | ...................... | H04W 72/042 |
| 2020/0059327 A1* | 2/2020 | Kini | ...................... | H04L 1/1812 |
| 2020/0236709 A1* | 7/2020 | Park | ...................... | H04L 1/1819 |
| 2020/0296761 A1* | 9/2020 | Liu | ........................ | H04L 5/0092 |
| 2020/0374933 A1* | 11/2020 | Lou | ....................... | H04L 1/1887 |

OTHER PUBLICATIONS

Huawei, HiSilicon, Contention window size adjustment for UL category 4 LBT for eLAA, R1-164073, 3GPP TSG RAN WG1 Meeting #85, Nanjing, China, May 23-27, 2016, 4 pages.

LG Electronics, Channel access procedure for autonomous UL access, R1-1719865, 3GPP TSG RAN WG1 Meeting 91, Reno, USA, Nov. 27-Dec. 1, 2017, 6 pages.

Samsung, SI Reception in RRC Connected: Bandwidth Part Aspects, R2-1710092, 3GPP TSG-RAN WG2 #99bis, Prague, Czech Republic, Oct. 9-13, 2017, 3 pages.

Extended European Search Report in EP Appln. No. 19751788.1, dated Dec. 22, 2020, 9 pages.

LG Electronics, "Channel access procedure for NR-U," R1-1900606, 3GPP TSG RAN WG1 Ad-Hoc Meeting 1901, Taipei, Taiwan, Jan. 21-25, 2019, 11 pages.

\* cited by examiner

METHOD FOR ADJUSTING SIZE OF CONTENTION WINDOW IN WIRELESS COMMUNICATION SYSTEM, AND COMMUNICATION DEVICE USING METHOD

CROSS-REFERENCE TO RELATED APPLICATIONS

Pursuant to 35 U.S.C. § 119(e), this application is a continuation of International Application PCT/KR2019/001711, with an international filing date of Feb. 12, 2019, which claims the benefit of U.S. Provisional Applications No. 62/629,689 filed on Feb. 12, 2018, No. 62/668,765 filed on May 8, 2018, Korean Patent Applications No. 10-2018-0057006 filed on May 18, 2018, and No. 10-2018-0114473 filed on Sep. 21, 2018, the contents of which are all hereby incorporated by reference herein in their entirety.

BACKGROUND ART

Field of the Disclosure

The present disclosure relates to wireless communication, and more particularly, to a method of adjusting a contention window size in a wireless communication system, and a communication device using the method.

Related Art

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

In a cellular communication system such as an LTE/NR system, an unlicensed band which is the same as a 2.4 gigahertz (GHz) band used generally by the legacy WiFi system or an unlicensed band which is the same as a 5 GHz and 60 GHz band getting new attention is considered to be utilized in traffic offloading.

Since it is assumed basically in the unlicensed band that wireless transmission/reception is achieved in a contention-based manner among respective communication nodes, it is required to perform channel sensing before the respective communication nodes transmit signals, so as to confirm that signal transmission is not achieved in other communication nodes. For convenience, such an operation is called a listen before talk (LBT), and in particular, an operation of confirming whether another communication node transmits a signal is defined as carrier sensing (CS). When it is determined that another communication node does not transmit the signal, this is defined such that a clear channel assessment (CCA) is confirmed.

An eNB or UE of an LTE/NR system must also perform the LBT for signal transmission in the unlicensed band (for convenience, referred to as a U-band). Regarding a communication technique using the unlicensed band, the NR requires a discussion on a beamforming technique using multiple antennas and a communication technique using a new unlicensed band considering a bandwidth part depending on bandwidth capability of the UE.

SUMMARY

The present disclosure provides a method of adjusting a contention window size in a wireless communication system, and a communication device using the method.

In one aspect, a method for adjusting a contention window size of a user equipment (UE) in a wireless communication system is provided. The method comprises transmitting data to a base station (BS) through a frequency band in a bandwidth part of the UE, wherein the bandwidth part is one part of a carrier bandwidth configured to the UE; receiving feedback information for the data from the BS; and adjusting the contention window size of the UE based on the feedback information, wherein the contention window size is a range of a counter value used in a channel access procedure (CAP) as an operation in which the UE determines channel occupancy, wherein the bandwidth part overlaps with a plurality of CAP bandwidths which are bandwidths in which the UE performs the channel access procedure, and wherein, based on the frequency band in which the data is transmitted overlapping with the plurality of CAP bandwidths, the UE adjusts the contention window size for at least one of the plurality of CAP bandwidths, based on the feedback information.

The UE may adjust only the contention window size for a CAP bandwidth having a greatest proportion of a resource to which the data is allocated among the plurality of CAP bandwidths.

The UE may adjust the contention window size for each of all of the plurality of CAP bandwidths in which the data overlaps.

The UE may perform a channel access procedure for the bandwidth part, and the UE may switch to a different bandwidth part when the UE fails in the CAP operation for a specific time duration or for at least a specific count.

The different bandwidth may be a pre-configured bandwidth part, a bandwidth part before switching, or an initial/default bandwidth part.

When the bandwidth part is switched, the contention window size may be adjusted to a minimum value for all priority classes.

When the bandwidth part is switched, the contention window size may be adjusted to a value used in a bandwidth part before switching.

When the bandwidth part is switched, the contention window size may be adjusted to a value included in downlink control information (DCI) reporting a bandwidth part switching command.

When the bandwidth part is switched, the contention window size may be adjusted to a value lower by one level than a value before switching among sizes allowed for all priority classes.

When the bandwidth part is switched, the contention window size may be adjusted to a value previously used in a corresponding bandwidth part.

The feedback information may comprise an uplink grant related to a hybrid automatic repeat request (HARQ) process identity (ID) used to transmit the data, if a new data indicator (NDI) of the feedback information is toggled, the contention window size may be adjusted to a minimum value for all priority classes, if the NDI of the feedback information is not toggled, the contention window size may be adjusted to a value one level higher with respect to all priority classes, and the contention window size to be adjusted may be the contention window size for a CAP bandwidth, having a greatest proportion of a resource to which the data is allocated among the plurality of CAP bandwidths.

When the counter value is initially set, the counter value may be set to any value greater than or equal to 0 and less than or equal to the contention window size.

The counter value may be adjusted by sensing a channel in the channel access procedure.

In another aspect, a method for adjusting a contention window size of a base station (BS) in a wireless communication system is provided. The method comprises transmitting data to a user equipment (UE) through a frequency band in a bandwidth part of the UE, wherein the bandwidth part is one part of a carrier bandwidth configured for the UE; receiving feedback information regarding the data from the UE; and adjusting the contention window size of the BS, based on the feedback information, wherein the contention window size is in the range of a counter value used in a channel access procedure (CAP) as an operation in which the BS determines channel occupancy, wherein the bandwidth part of the UE overlaps with a plurality of CAP bandwidths which are bandwidths in which the BS performs the channel access procedure, and wherein, when the frequency band in which the data is transmitted overlaps with the plurality of CAP bandwidths, the BS adjusts the contention window size for at least one of the plurality of CAP bandwidths, based on the feedback information.

The BS may adjust only the contention window size for a CAP bandwidth having a greatest proportion of a resource to which the data is allocated among the plurality of CAP bandwidths.

The BS may adjust the contention window size for each of all of the plurality of CAP bandwidths in which the data overlaps.

In another aspect, provided is a user equipment (UE) comprising a transceiver transmitting and receiving a radio signal; and a processor operatively coupled with the transceiver, wherein the processor is configured to transmit data to a base station (BS) through a frequency band in a bandwidth part of the UE, wherein the bandwidth part is one part of a carrier bandwidth configured to the UE; receive feedback information for the data from the BS; and adjust the contention window size of the UE based on the feedback information, wherein the contention window size is a range of a counter value used in a channel access procedure (CAP) as an operation in which the UE determines channel occupancy, wherein the bandwidth part overlaps with a plurality of CAP bandwidths which are bandwidths in which the UE performs the channel access procedure, and wherein, based on the frequency band in which the data is transmitted overlapping with the plurality of CAP bandwidths, the UE adjusts the contention window size for at least one of the plurality of CAP bandwidths, based on the feedback information.

According to the present disclosure, a method of performing listen before talk (LBT) based on transmission for each bandwidth part and beam introduced in an NR system, a method of adjusting a contention window size, and a method of performing LBT considering a time gap between an LBT success timing and an actual transmission timing are proposed to enable more effective communication using an unlicensed band in the NR system.

DESCRIPTION OF EXEMPLARY
EMBODIMENTS

Figure 1:
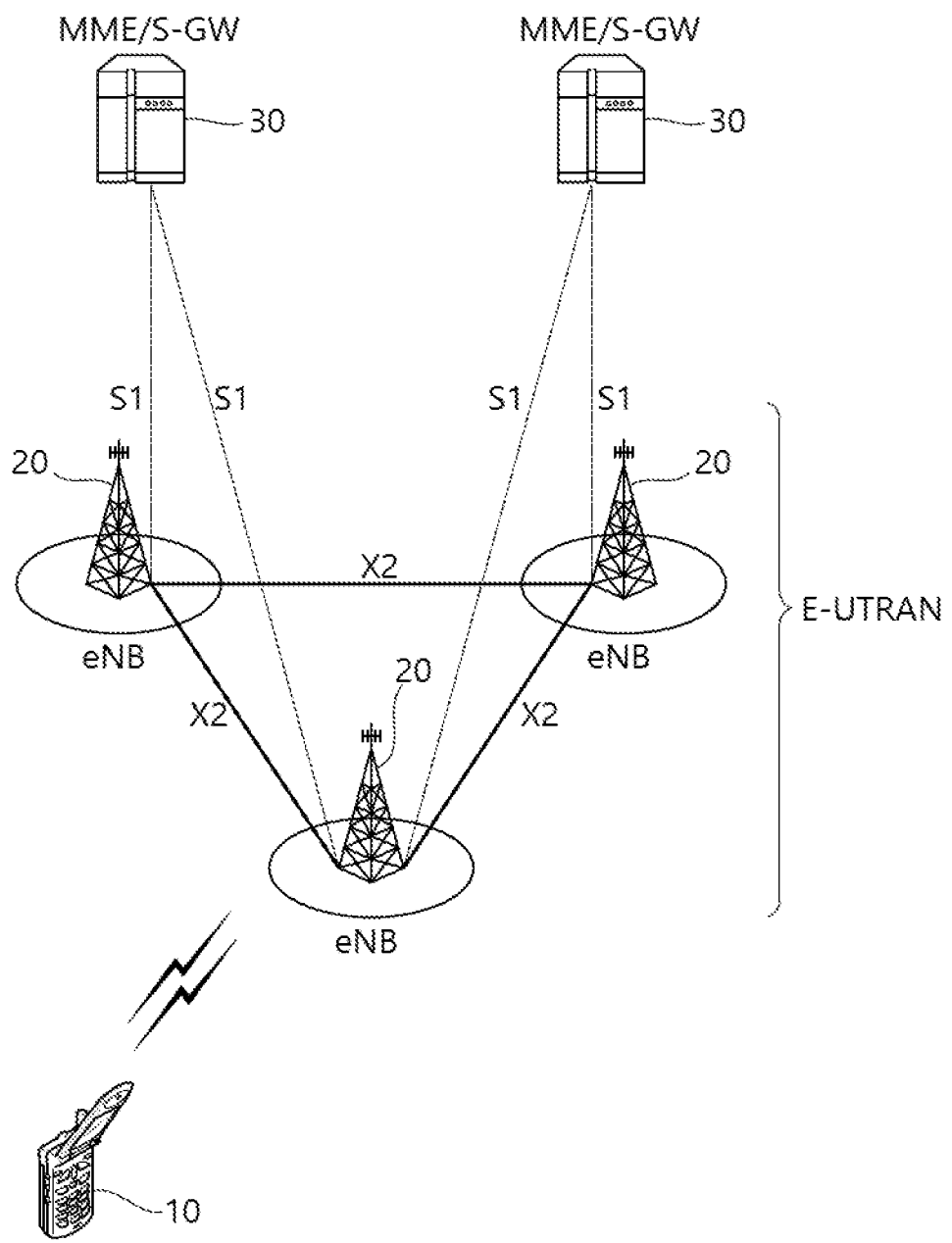
FIG. 1 shows a wireless communication system to which the present disclosure may be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
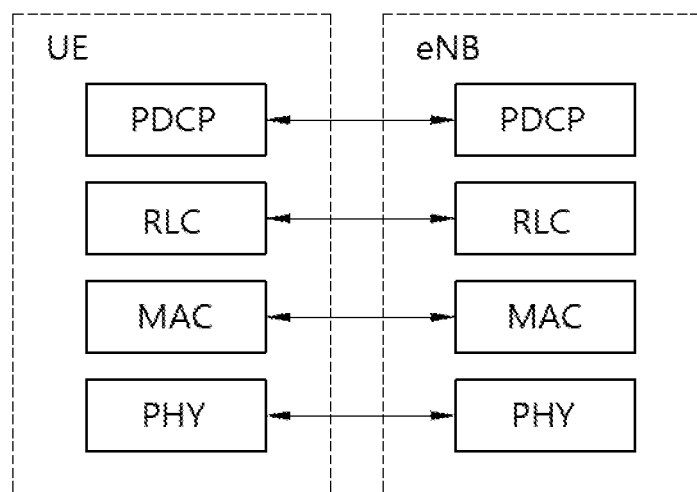
FIG. 2 is a diagram showing a wireless protocol architecture for a user plane.
Figure 3:
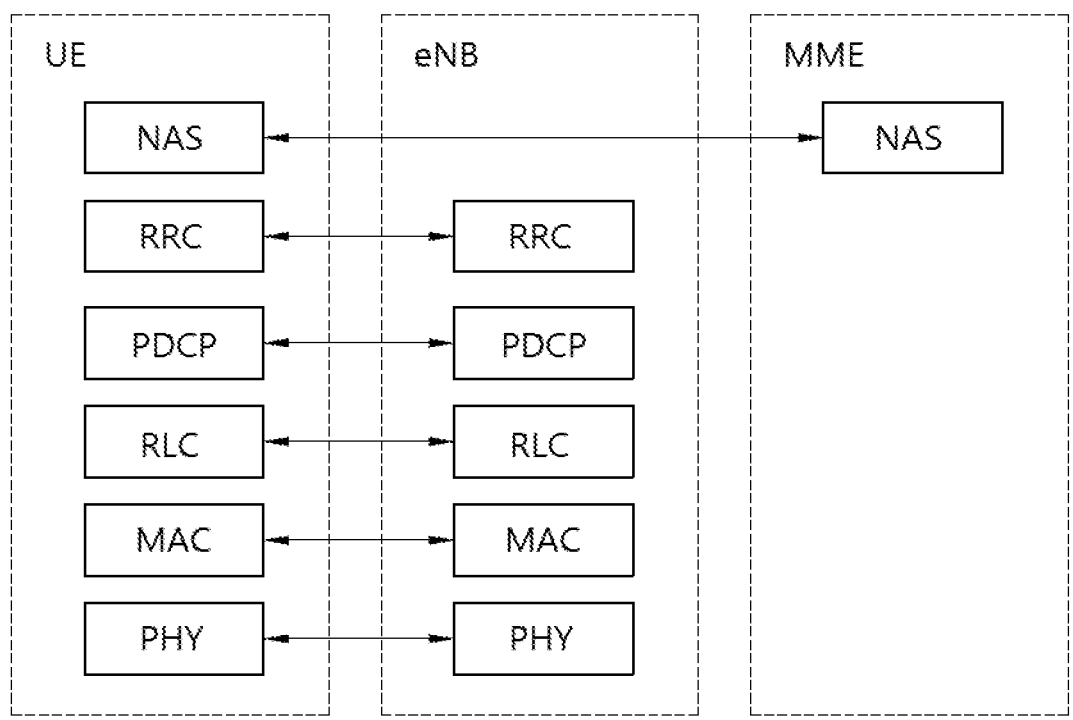
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
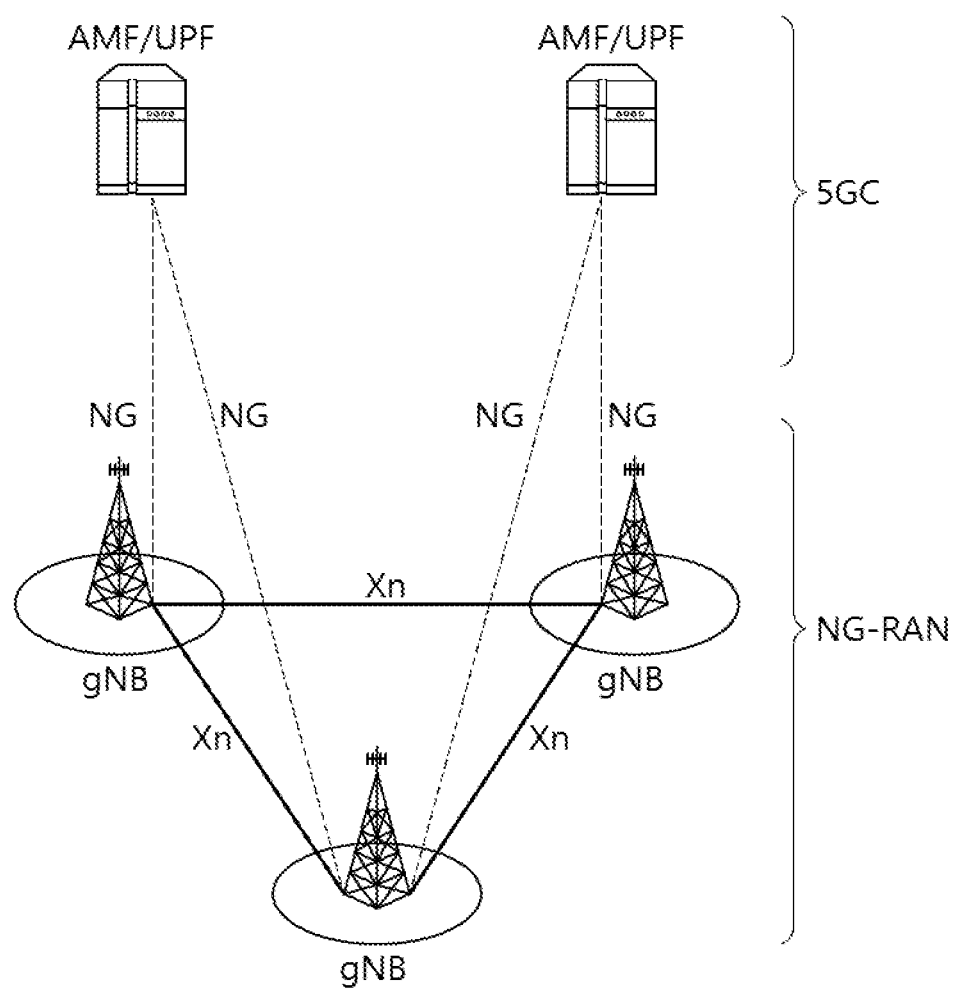
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a terminal. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 5:
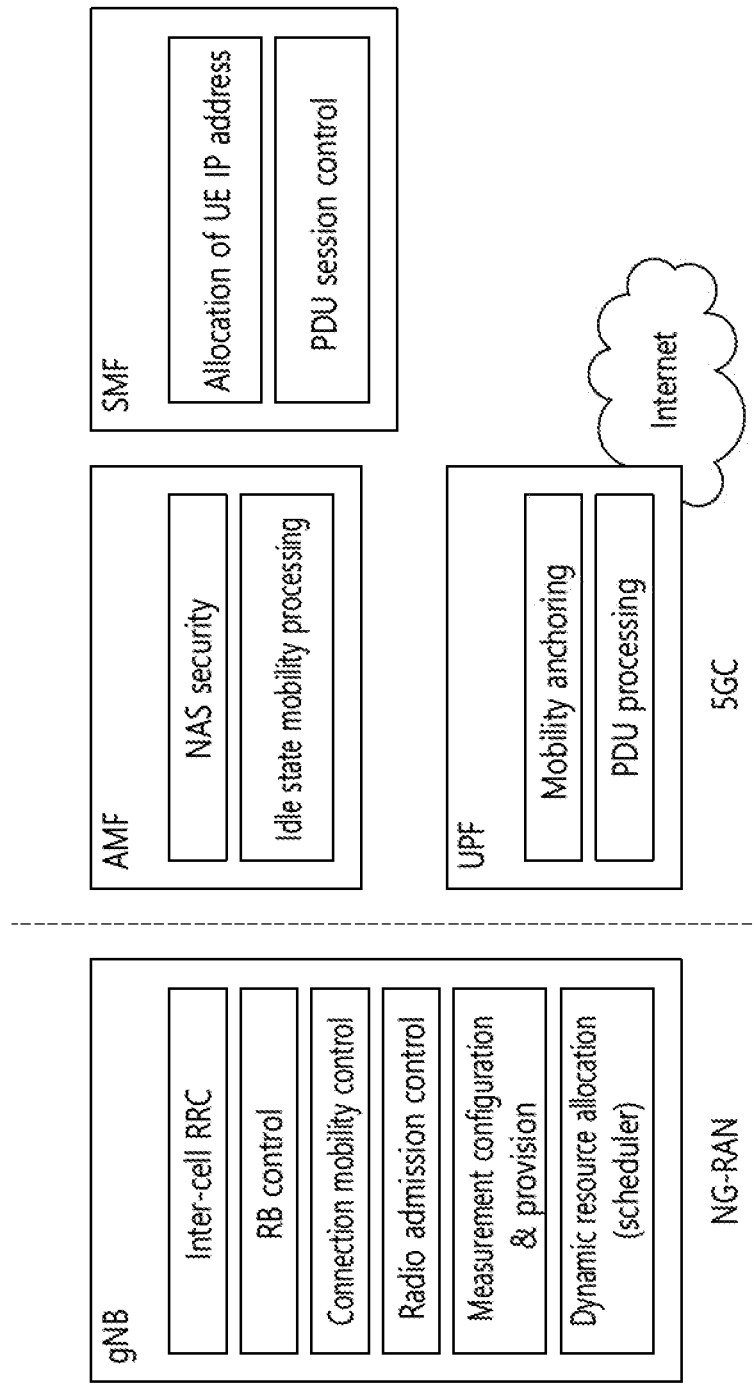
FIG. 5 illustrates a functional division between an NG-RAN and a 5GC.

FIG. 5 illustrates a functional division between an NG-RAN and a 5GC.

The gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
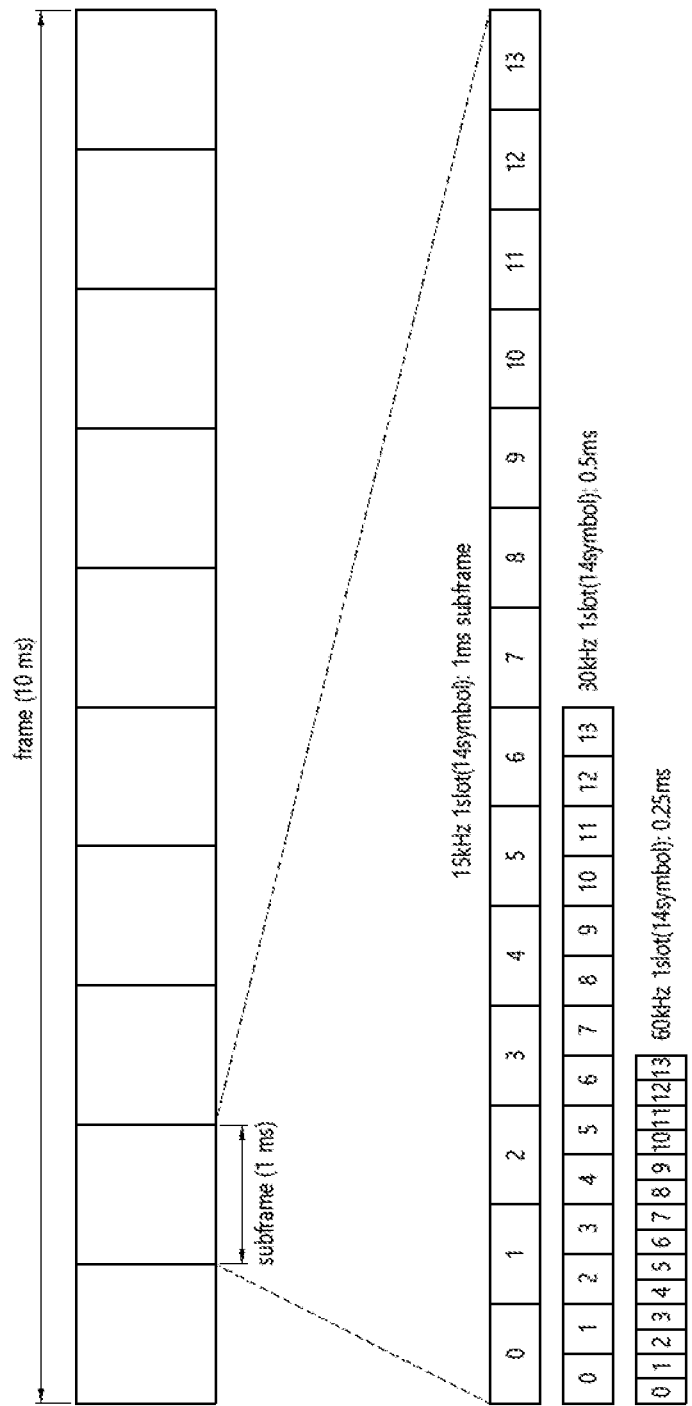
FIG. 6 illustrates an example of a frame structure that may be applied in NR.

FIG. 6 illustrates an example of a frame structure that may be applied in NR.

Referring to FIG. 6, a frame may be composed of 10 milliseconds (ms) and include 10 subframes each composed of 1 ms.

One or a plurality of slots may be included in a subframe according to subcarrier spacings.

The following table 1 illustrates a subcarrier spacing configuration μ.

TABLE 1

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal |
|   |    | Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In FIG. 6, μ=0, 1, 2 is illustrated.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, in a future wireless communication system, a new unit called a control resource set (CORESET) may be introduced. The terminal may receive the PDCCH in the CORESET.

Figure 7:
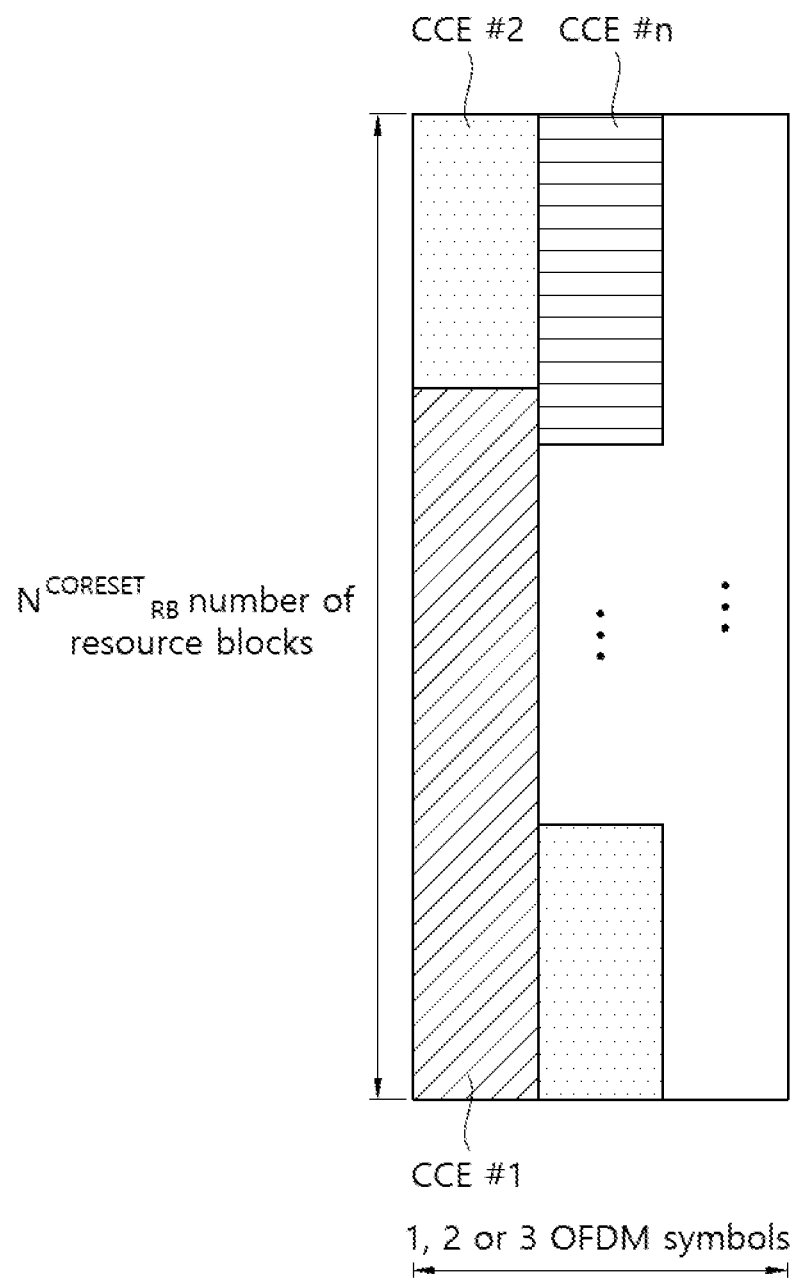
FIG. 7 illustrates CORESET.

FIG. 7 illustrates CORESET.

Referring to FIG. 7, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 7, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 8:
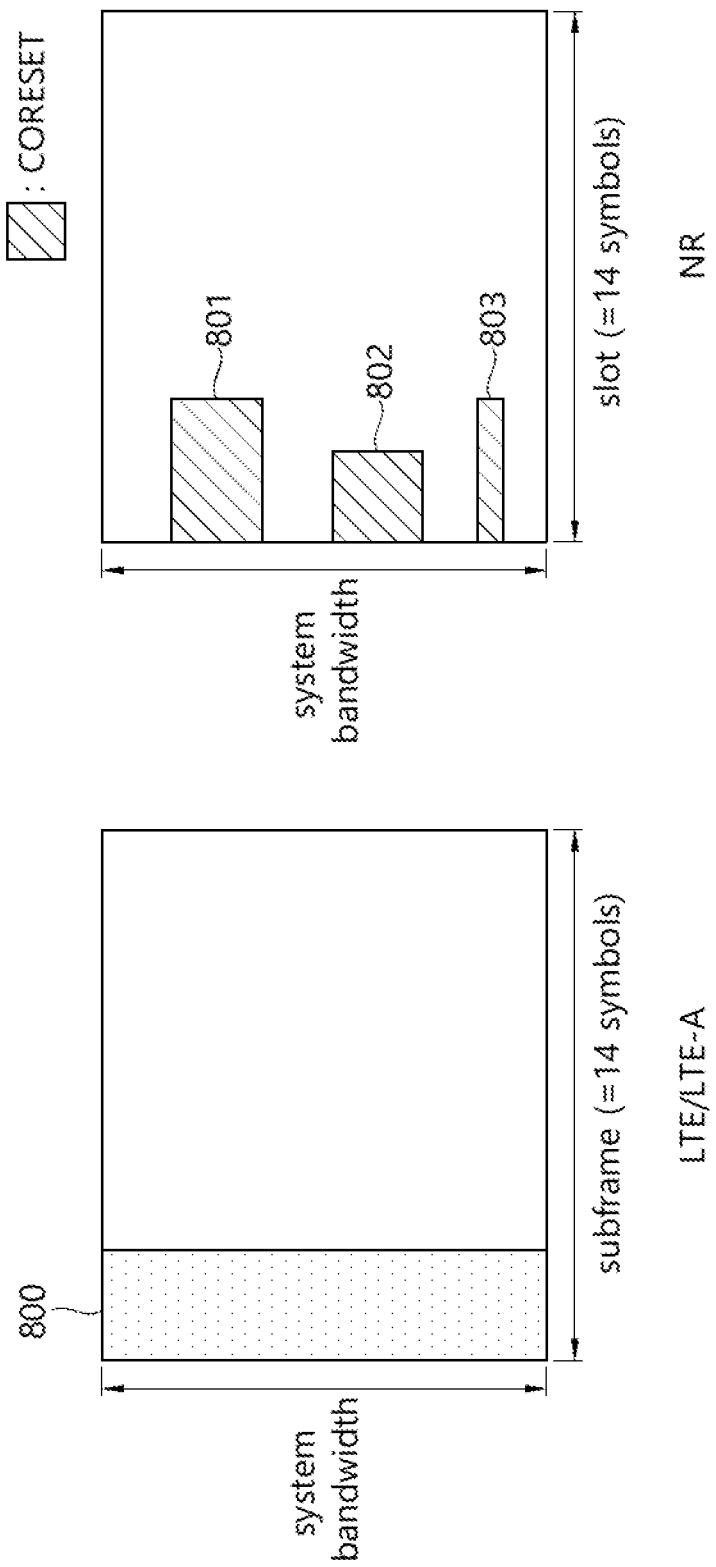
FIG. 8 is a diagram illustrating a difference between a related art control region and the CORESET in NR.

FIG. 8 is a diagram illustrating a difference between a related art control region and the CORESET in NR.

Referring to FIG. 8, a control region 800 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

On the other hand, in NR, CORESET described above was introduced. CORESETs 801, 802, and 803 are radio resources for control information to be received by the terminal and may use only a portion, rather than the entirety of the system bandwidth. The BS may allocate the CORESET to each UE and may transmit control information through the allocated CORESET. For example, in FIG. 8, a first CORESET 801 may be allocated to UE 1, a second CORESET 802 may be allocated to UE 2, and a third CORESET 803 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 9:
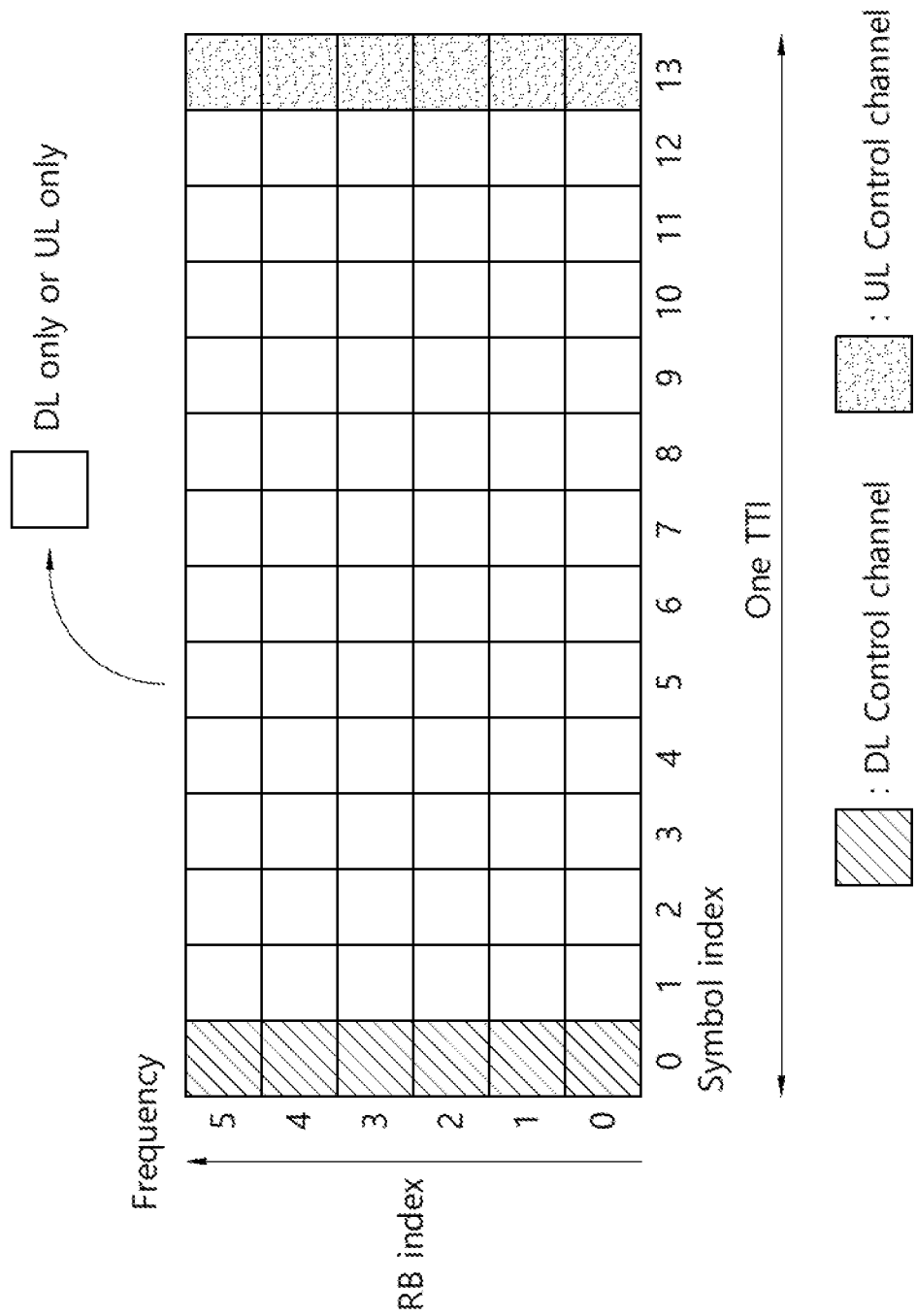
FIG. 9 illustrates an example of a frame structure for new radio access technology.

FIG. 9 illustrates an example of a frame structure for new radio access technology.

In NR, a structure in which a control channel and a data channel are time-division-multiplexed within one TTI, as shown in FIG. 9, can be considered as a frame structure in order to minimize latency.

In FIG. 9, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

Figure 10:
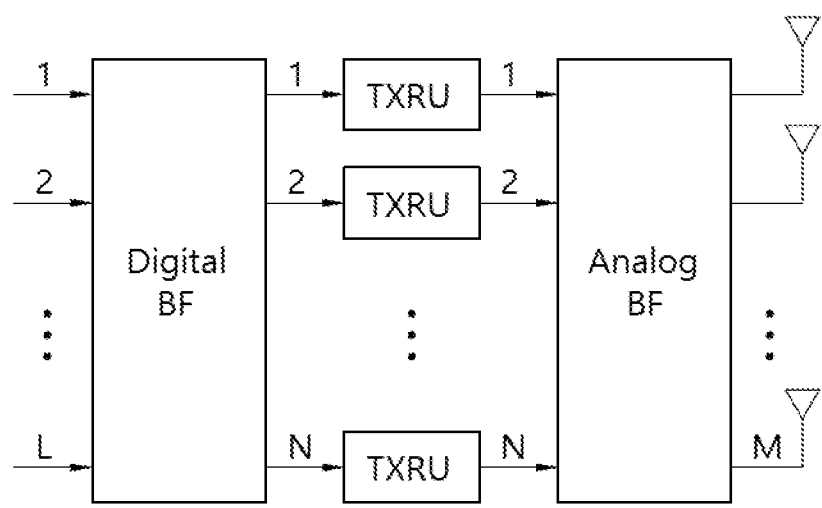
FIG. 10 is an abstract schematic diagram illustrating hybrid beamforming from the viewpoint of TXRUs and physical antennas.

FIG. 10 is an abstract schematic diagram illustrating hybrid beamforming from the viewpoint of TXRUs and physical antennas.

In FIG. 10, the number of digital beams is L and the number of analog beams is N. Further, in the NR system, by designing the base station to change the analog beamforming in units of symbols, it is considered to support more efficient beamforming for a terminal located in a specific area. Furthermore, when defining N TXRUs and M RF antennas as one antenna panel in FIG. 7, it is considered to introduce a plurality of antenna panels to which independent hybrid beamforming is applicable in the NR system.

When a base station uses a plurality of analog beams as described above, analog beams suitable to receive signals may be different for terminals and thus a beam sweeping operation of sweeping a plurality of analog beams to be applied by a base station per symbol in a specific subframe (SF) for at least a synchronization signal, system information and paging such that all terminals can have reception opportunities is considered.

Figure 11:
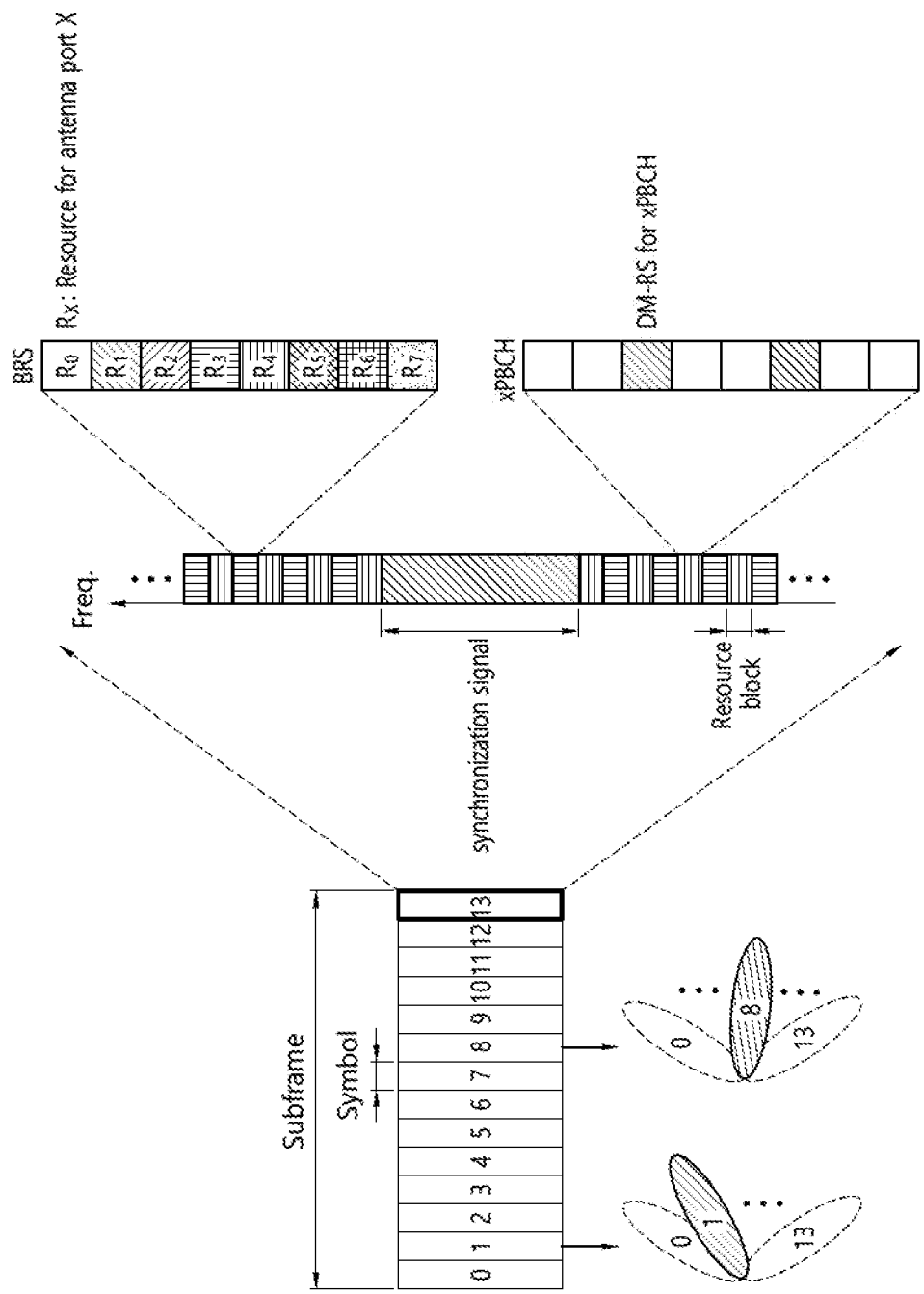
FIG. 11 illustrates the beam sweeping operation for a synchronization signal and system information in a downlink (DL) transmission procedure.

FIG. 11 illustrates the beam sweeping operation for a synchronization signal and system information in a downlink (DL) transmission procedure.

In FIG. 11, physical resources (or a physical channel) in which system information of the NR system is transmitted in a broadcasting manner is referred to as a physical broadcast channel (xPBCH). Here, analog beams belonging to different antenna panels can be simultaneously transmitted within one symbol, and a method of introducing a beam reference signal (BRS) which is a reference signal (RS) to which a single analog beam (corresponding to a specific antenna panel) is applied in order to measure a channel per analog beam, as illustrated in FIG. 8, is under discussion. The BRS can be defined for a plurality of antenna ports, and each antenna port of the BRS can correspond to a single analog beam. Here, all analog beams in an analog beam group are applied to the synchronization signal or xPBCH and then the synchronization signal or xPBCH is transmitted such that an arbitrary terminal can successively receive the synchronization signal or xPBCH.

<Bandwidth Part (BWP)>

An NR system may support up to 400 megahertz (MHz) for each one component carrier (CC). If a UE operating in such a wideband CC operates always in a state where RF is powered on for the entire CC, battery consumption of the UE may increase. Alternatively, considering multiple use cases (e.g., eMBB, URLLC, mMTC, etc.) operating in one wideband CC, different numerologies (e.g., sub-carrier spacing (SCS)) may be supported for different frequency bands in the CC. Alternatively, each UE may have different capability for a maximum bandwidth. In this regard, a BS may indicate to the UE that an operation is to be performed only in a partial bandwidth, not the entire bandwidth of the wideband CC. For convenience, the partial bandwidth is defined as a bandwidth part (BWP). The BWP may consist of resource blocks (RBs) consecutive on a frequency axis, and may correspond to one numerology (e.g., an SCS, a cyclic prefix (CP) length, a slot/mini-slot duration, etc.).

Meanwhile, the BS may configure a plurality of BWPs in one CC configured for the UE. For example, a BWP occupying a relatively small frequency domain may be configured in a PDCCH monitoring slot, and a PDSCH indicated in a PDCCH may be scheduled on a BWP greater than that. Alternatively, when UEs are concentrated at a specific BWP, for load balancing, another BWP may be configured for some of the UEs. Alternatively, BWPs at both sides may be configured in the same slot by excluding some center spectra from the entire bandwidth considering frequency domain inter-cell interference cancellation between adjacent cells. That is, the BS may configure at least one DL/UL BWP for the UE associated with the wideband CC. At least one DL/UL BWP among DL/UL BWP(s) configured at a specific timing may be activated (by L1 signaling or MAC CE or RRC signaling or the like). Switching to another configured DL/UL BWP may be indicated (by L1 signaling or MAC CE or RRC signaling or the like). Switching to a predetermined DL/UL BWP may occur upon expiration of a timer value according to a timer. In this case, an activated DL/UL BWP is defined as an active DL/UL BWP. When in an initial access process or in a situation before an RRC connection is set up or the like, the UE may not receive a configuration for the DL/UL BWP. A DL/UL BWP assumed by the UE in such a situation is defined as an initial active DL/UL BWP.

Hereinafter, a channel access procedure based on licensed-assisted access (LAA) will be described.

First, a downlink channel access procedure will be described.

An eNB operating LAA Scell(s) shall perform the channel access procedures described in this sub clause for accessing the channel(s) on which the LAA Scell(s) transmission(s) are performed.

Hereinafter, a channel access procedure for transmission(s) including PDSCH/PDCCH/EPDCCH will be described.

The eNB may transmit a transmission including PDSCH/PDCCH/EPDCCH on a carrier on which LAA Scell(s) transmission(s) are performed, after first sensing the channel to be idle during the slot durations of a defer duration $T_d$; and after the counter N is zero in step 4. The counter N is adjusted by sensing the channel for additional slot duration(s) according to the steps below:

1) set N=$N_{init}$, where $N_{init}$ is a random number uniformly distributed between 0 and $CW_p$, and go to step 4;

2) if N>0 and the eNB chooses to decrement the counter, set N=N-1;

3) sense the channel for an additional slot duration, and if the additional slot duration is idle, go to step 4; else, go to step 5;

4) if N=0, stop; else, go to step 2.

5) sense the channel until either a busy slot is detected within an additional defer duration $T_d$ or all the slots of the additional defer duration $T_d$ are detected to be idle;

6) if the channel is sensed to be idle during all the slot durations of the additional defer duration $T_d$, go to step 4; else, go to step 5;

If an eNB has not transmitted a transmission including PDSCH/PDCCH/EPDCCH on a carrier on which LAA Scell(s) transmission(s) are performed after step 4 in the procedure above, the eNB may transmit a transmission including PDSCH/PDCCH/EPDCCH on the carrier, if the channel is sensed to be idle at least in a slot duration $T_{sl}$ when the eNB is ready to transmit PDSCH/PDCCH/EPDCCH and if the channel has been sensed to be idle during all the slot durations of a defer duration $T_d$ immediately before this transmission. If the channel has not been sensed to be idle in a slot duration $T_{sl}$ when the eNB first senses the channel after it is ready to transmit or if the channel has been sensed to be not idle during any of the slot durations of a defer duration $T_d$ immediately before this intended transmission, the eNB proceeds to step 1 after sensing the channel to be idle during the slot durations of a defer duration $T_d$.

The defer duration $T_d$ consists of duration $T_f$=16 us immediately followed by $m_p$ consecutive slot durations where each slot duration is $T_{sl}$=9 us, s and $T_f$ includes an idle slot duration $T_{sl}$ at start of $T_f$;

A slot duration $T_{sl}$ is considered to be idle if the eNB senses the channel during the slot duration, and the power detected by the eNB for at least 4 us within the slot duration is less than energy detection threshold $X_{Thresh}$. Otherwise, the slot duration $T_{sl}$ is considered to be busy.

$CW_{min,p} \leq CW_p \leq CW_{max,p}$ is the contention window. $CW_p$ adjustment is described in contention window adjustment procedure.

$CW_{min,p}$ and $CW_{max,p}$ are chosen before step 1 of the procedure above.

$m_p$, $CW_{min,p}$, and $CW_{max,p}$ are based on channel access priority class associated with the eNB transmission, as shown in Table 4.

If the eNB transmits discovery signal transmission(s) not including PDSCH/PDCCH/EPDCCH when N>0 in the procedure above, the eNB shall not decrement N during the slot duration(s) overlapping with discovery signal transmission.

The eNB shall not continuously transmit on a carrier on which the LAA Scell(s) transmission(s) are performed, for a period exceeding $T_{mcot,p}$ as given in Table 4.

For p=3 and p=4, if the absence of any other technology sharing the carrier can be guaranteed on a long term basis (e.g. by level of regulation), $T_{mcot,p}$=10 ms, otherwise, $T_{mcot,p}$=8 ms.

Table 4 is a table for a channel access priority class.

TABLE 4

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Hereinafter, a channel access procedure for transmission(s) including discovery signal transmission(s) and not including PDSCH will be described.

An eNB may transmit a transmission including discovery signal but not including PDSCH on a carrier on which LAA Scell(s) transmission(s) are performed immediately after sensing the channel to be idle for at least a sensing interval $T_{drs}$=25 us and if the duration of the transmission is less than 1 ms. $T_{drs}$ consists of a duration $T_f$=16 us immediately followed by one slot duration $T_{sl}$9 us and $T_f$ includes an idle slot duration $T_{sl}$ at start of $T_f$. The channel is considered to be idle for $T_{drs}$ if it is sensed to be idle during the slot durations of $T_{drs}$.

Hereinafter, a contention window adjustment procedure will be described.

If the eNB transmits transmissions including PDSCH that are associated with channel access priority class p on a carrier, the eNB maintains the contention window value $CW_p$ and adjusts $CW_p$ before step 1 of the aforementioned procedure for those transmissions using the following steps:

1) for every priority class $p \in \{1, 2, 3, 4\}$ set $CW_p = CW_{min,p}$ 2) if at least Z=80% of HARQ-ACK values corresponding to PDSCH transmission(s) in reference subframe k are determined as NACK, increase $CW_p$ for every priority class $p \in \{1, 2, 3, 4\}$ to the next higher allowed value and remain in step 2; otherwise, go to step 1.

Reference subframe k is the starting subframe of the most recent transmission on the carrier made by the eNB, for which at least some HARQ-ACK feedback is expected to be available.

The eNB shall adjust the value of $CW_p$ for every priority class $p \in \{1, 2, 3, 4\}$ based on a given reference subframe k only once.

If $CW_p = CW_{max,p}$, the next higher allowed value for adjusting $CW_p$ is $CW_{max,p}$.

For determining Z,
- if the eNB transmission(s) for which HARQ-ACK feedback is available start in the second slot of subframe k, HARQ-ACK values corresponding to PDSCH transmission(s) in subframe k+1 are also used in addition to the HARQ-ACK values corresponding to PDSCH transmission(s) in subframe k.
- if the HARQ-ACK values correspond to PDSCH transmission(s) on an LAA SCell that are assigned by (E)PDCCH transmitted on the same LAA SCell,
  - if no HARQ-ACK feedback is detected for a PDSCH transmission by the eNB, or if the eNB detects 'DTX', 'NACK/DTX' or 'any' state, it is counted as NACK.
- if the HARQ-ACK values correspond to PDSCH transmission(s) on an LAA SCell that are assigned by (E)PDCCH transmitted on another serving cell,
  - if the HARQ-ACK feedback for a PDSCH transmission is detected by the eNB, 'NACK/DTX' or 'any' state is counted as NACK, and 'DTX' state is ignored.
  - if no HARQ-ACK feedback is detected for a PDSCH transmission by the eNB,
    - if PUCCH format 1b with channel selection is expected to be used by the UE, 'NACK/DTX' state corresponding to 'no transmission' is counted as NACK, and 'DTX' state corresponding to 'no transmission' is ignored. Otherwise, the HARQ-ACK for the PDSCH transmission is ignored.
- if a PDSCH transmission has two codewords, the HARQ-ACK value of each codeword is considered separately.
- bundled HARQ-ACK across M subframes is considered as M HARQ-ACK responses.

If the eNB transmits transmissions including PDCCH/EPDCCH with DCI format 0A/0B/4A/4B and not including PDSCH that are associated with channel access priority class p on a channel starting from time $t_0$, the eNB maintains the contention window value $CW_p$ and adjusts $CW_p$ before step 1 of the procedure described in sub clause 15.1.1 for those transmissions using the following steps:

1) for every priority class $p \in \{1, 2, 3, 4\}$ set $CW_p = CW_{min,p}$ 2) if less than 10% of the UL transport blocks scheduled by the eNB using Type 2 channel access procedure in the time interval between $t_0$ and $t_0 + T_{CO}$ have been received successfully, increase $CW_p$ for every priority class $p \in \{1, 2, 3, 4\}$ to the next higher allowed value and remain in step 2; otherwise, go to step 1.

If the $CW_p = CW_{max,p}$ is consecutively used K times for generation of $N_{init}$, $CW_p$ is reset to $CW_{min,p}$ only for that priority class p for which $CW_p = CW_{max,p}$ is consecutively used K times for generation of $N_{init}$. K is selected by eNB from the set of values $\{1, 2, \ldots, 8\}$ for each priority class $p \in \{1, 2, 3, 4\}$.

Hereinafter, an energy detection threshold adaptation procedure will be described.

An eNB accessing a carrier on which LAA Scell(s) transmission(s) are performed, shall set the energy detection threshold ($X_{Thresh}$) to be less than or equal to the maximum energy detection threshold $X_{Thresh\_max}$.

$X_{Thresh\_max}$ is determined as follows:

If the absence of any other technology sharing the carrier can be guaranteed on a long term basis (e.g. by level of regulation) then:

$$X_{Thresh\_max} = \min\left\{\begin{array}{c} T_{max} + 10\,\text{dB}, \\ X_r \end{array}\right\}$$

$X_r$ is Maximum energy detection threshold defined by regulatory requirements in dBm when such requirements are defined, otherwise $X_r = T_{max} + 10$ dB.

Otherwise, $$X_{Thres\_max} = \max\left\{\min\left\{\begin{array}{c} -72 + 10 \cdot \log 10(BWMHz/20\,\text{MHz})\,\text{dBm}, \\ T_{max}, \\ T_{max} - T_A + (P_H + 10 \cdot \log 10(BWMHz/20\,\text{MHz}) - P_{TX}) \end{array}\right\}\right\}$$

where:
- $T_A = 10$ dB for transmission(s) including PDSCH;
- $T_A = 5$ dB for transmissions including discovery signal transmission(s) and not including PDSCH;
- $P_H = 23$ dBm;
- $P_{TX}$ is the set maximum eNB output power in dBm for the carrier;
  - eNB uses the set maximum transmission power over a single carrier irrespective of whether single carrier or multi-carrier transmission is employed.

$T_{max}(\text{dBm}) = 10 \cdot \log 10(3.16228 \cdot 10^{-8}(\text{mW/MHz}) \cdot BWMHz(\text{MHz}))$ BWMHz is the single carrier bandwidth in MHz.

Hereinafter, a channel access procedure for transmission(s) on a plurality of carriers will be described.

An eNB can access multiple carriers on which LAA Scell(s) transmission(s) are performed, according to one of the Type A or Type B procedures to be described later.

Hereinafter, a type-A multi-carrier access procedure will be described.

The eNB shall perform channel access on each carrier $c_i \in C$, according to the aforementioned channel access procedure for transmission(s) including PDSCH/PDCCH/EPDCCH, where C is a set of carriers on which the eNB intends to transmit, and $i = 0, 1, \ldots q-1$, and q is the number of carriers on which the eNB intends to transmit.

The counter N described in the aforementioned channel access procedure for transmission(s) including PDSCH/PDCCH/EPDCCH is determined for each carrier $c_i$ and is denoted as $N_{c_i}$. $N_{c_i}$ is maintained according to Type A1 or Type A2.

Hereinafter, a type A1 will be described.

Counter N as described in the aforementioned channel access procedure for transmission(s) including PDSCH/PDCCH/EPDCCH is independently determined for each carrier $c_i$ and is denoted as $N_{c_i}$.

If the absence of any other technology sharing the carrier cannot be guaranteed on a long term basis (e.g. by level of regulation), when the eNB ceases transmission on any one carrier $c_j \in C$, for each carrier $c_i \neq c_j$, the eNB can resume decrementing $N_{c_i}$ when idle slots are detected either after waiting for a duration of $4 \cdot T_{sl}$, or after reinitialising $N_{c_i}$.

Hereinafter, a type A2 will be described.

Counter N is determined as described in the aforementioned channel access procedure for transmission(s) including PDSCH/PDCCH/EPDCCH for carrier $c_j \in C$, and is denoted as $N_{c_j}$, where $c_j$ is the carrier that has the largest $CW_p$ value. For each carrier $c_i$, $N_{c_i} = N_{c_j}$. When the eNB ceases transmission on any one carrier for which $N_{c_i}$ is determined, the eNB shall reinitialise $N_{c_i}$ for all carriers.

Hereinafter, a type B multi-carrier access procedure will be described.

A carrier $c_j \in C$ is selected by the eNB as follows:

the eNB selects $c_j$ by uniformly randomly choosing $c_j$ from C before each transmission on multiple carriers $c_i \in C$, or the eNB selects $c_j$ no more frequently than once every 1 second.

Here, C is a set of carriers on which the eNB intends to transmit, $i=0, 1, \ldots q-1$, and q is the number of carriers on which the eNB intends to transmit.

To transmit on carrier $c_j$,

The eNB shall perform channel access on a carrier $c_j$ according to the aforementioned channel access procedure for transmission(s) including the PDSCH/PDCCH/EPDCCH, with a modification for a type B1 or type B2 described below.

To transmit on carrier $c_i \neq c_j$, $c_i \in C$, for each carrier $c_i$, the eNB shall sense the carrier $c_i$ for at least a sensing interval $T_{mc}=25$ us immediately before the transmitting on carrier $c_j$, and the eNB may transmit on carrier $c_i$ immediately after sensing the carrier $c_i$ to be idle for at least the sensing interval $T_{mc}$. The carrier $c_i$ is considered to be idle for $T_{mc}$ if the channel is sensed to be idle during all the time durations in which such idle sensing is performed on the carrier $c_j$ in given interval $T_{mc}$.

The eNB shall not continuously transmit on a carrier $c_i \neq c_j$, $c_i \in C$, for a period exceeding $T_{mcot,p}$ as given in Table 4, where the value of $T_{mcot,p}$ is determined using the channel access parameters used for carrier $c_j$.

Hereinafter, a type B1 will be described.

A single $CW_p$ value is maintained for the set of carriers C.

For determining $CW_p$ for channel access on carrier $c_j$, step 2 of the aforementioned contention window adjustment procedure is modified as follows:

if at least Z=80% of HARQ-ACK values corresponding to PDSCH transmission(s) in reference subframe k of all carriers $c_i \in C$ are determined as NACK, increase $CW_p$ for each priority class $p \in \{1, 2, 3, 4\}$ to the next higher allowed value; otherwise, go to step 1.

Hereinafter, a type B2 will be described.

A $CW_p$ value is maintained independently for each carrier $c_i \in C$ using the aforementioned contention window adjustment procedure.

For determining $N_{init}$ for carrier $c_j$, $CW_p$ value of carrier $c_{j1} \in C$ is used, where $c_{j1}$ is the carrier with largest $CW_p$ among all carriers in set C.

Hereinafter, a UL channel access procedure will be described.

A UE and a eNB scheduling UL transmission(s) for the UE shall perform the procedures described below for the UE to access the channel(s) on which the LAA Scell(s) transmission(s) are performed.

Hereinafter, a channel access procedure for uplink transmission(s) will be described.

The UE can access a carrier on which LAA Scell(s) UL transmission(s) are performed according to one of Type 1 or Type 2 UL channel access procedures.

If an UL grant scheduling a PUSCH transmission indicates Type 1 channel access procedure, the UE shall use Type 1 channel access procedure for transmitting transmissions including the PUSCH transmission unless stated otherwise below.

If an UL grant scheduling a PUSCH transmission indicates Type 2 channel access procedure, the UE shall use Type 2 channel access procedure for transmitting transmissions including the PUSCH transmission unless stated otherwise below.

The UE shall use Type 1 channel access procedure for transmitting SRS transmissions not including a PUSCH transmission. UL channel access priority class p=1 is used for SRS transmissions not including a PUSCH.

Table 5 is for a channel access priority class for uplink.

TABLE 5

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 3 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulmcot,p}$ = 10 ms if the higher layer parameter 'absenceOfAnyOtherTechnology-r14' indicates TRUE, otherwise, $T_{ulmcot,p}$ = 6 ms.
NOTE 2:
When $T_{ulmcot,p}$ = 6 ms it may be increased to 8 ms by inserting one or more gaps. The minimum duration of a gap shall be 100 μs. The maximum duration before including any such gap shall be 6 ms..

If the 'UL configuration for LAA' field configures an 'UL offset' l and an 'UL duration' d for subframe $\gamma_i$, then the UE may use channel access Type 2 for transmissions in subframes n+l+i where $i=0, 1, \ldots d-1$, irrespective of the channel access Type signalled in the UL grant for those subframes, if the end of UE transmission occurs in or before subframe n+l+d−1.

If the UE scheduled to transmit transmissions including PUSCH in a set subframes $n_0, n_1, \ldots, n_{w-1}$ using PDCCH DCI Format 0B/4B, and if the UE cannot access the channel for a transmission in subframe $n_k$, the UE shall attempt to make a transmission in subframe $n_{k+1}$ according to the channel access type indicated in the DCI, where $k \in \{0, 1, \ldots w-2\}$, and w is the number of scheduled subframes indicated in the DCI.

If the UE is scheduled to transmit transmissions without gaps including PUSCH in a set of subframes $n_0, n_1, \ldots n_{w-1}$ using one or more PDCCH DCI Format 0A/0B/4A/4B and the UE performs a transmission in subframe $n_k$ after accessing the carrier according to one of Type 1 or Type 2 UL channel access procedures, the UE may continue transmission in subframes after $n_k$ where $k \in \{0, 1, \ldots w-1\}$.

If the beginning of UE transmission in subframe n+1 immediately follows the end of UE transmission in subframe $\gamma_i$, the UE is not expected to be indicated with different channel access types for the transmissions in those subframes.

If the UE is scheduled to transmit without gaps in subframes $n_0, n_1, \ldots n_{w-1}$ using one or more PDCCH DCI Format 0A/0B/4A/4B, and if the UE has stopped transmitting during or before subframe $n_{k1}$, $k1 \in \{0, 1, \ldots w-2\}$, and if the channel is sensed by the UE to be continuously idle after the UE has stopped transmitting, the UE may transmit in a later subframe $n_{k2}$, $k2 \in \{1, \ldots w-1\}$ using Type 2 channel access procedure. If the channel sensed by the UE is not continuously idle after the UE has stopped transmitting, the UE may transmit in a later subframe $n_{k2}$, $k2 \in \{1, \ldots w-1\}$ using Type 1 channel access procedure with the UL channel access priority class indicated in the DCI corresponding to subframe $n_{k2}$.

If the UE receives an UL grant and the DCI indicates a PUSCH transmission starting in subframe $\gamma_i$ using Type 1 channel access procedure, and if the UE has an ongoing Type 1 channel access procedure before subframe $\gamma_i$.
- if the UL channel access priority class value $p_i$ used for the ongoing Type 1 channel access procedure is same or larger than the UL channel access priority class value $p_2$ indicated in the DCI, the UE may transmit the PUSCH transmission in response to the UL grant by accessing the carrier by using the ongoing Type 1 channel access procedure.
- if the UL channel access priority class value $p_1$ used for the ongoing Type 1 channel access procedure is smaller than the UL channel access priority class value $p_2$ indicated in the DCI, the UE shall terminate the ongoing channel access procedure.

If the UE is scheduled to transmit on a set of carriers C in subframe $\gamma_i$, and if the UL grants scheduling PUSCH transmissions on the set of carriers C indicate Type 1 channel access procedure, and if the same 'PUSCH starting position' is indicated for all carriers in the set of carriers C, and if the carrier frequencies of set of carriers C is a subset of one of the predefined sets of carrier frequencies,
- the UE may transmit on carrier $c_i \in C$ using Type 2 channel access procedure,
  - if Type 2 channel access procedure is performed on carrier $c_i$ immediately before the UE transmission on carrier $c_j \in C$, $i \neq j$, and
  - if the UE has accessed carrier $c_j$ using Type 1 channel access procedure,
    - where carrier $c_j$ is selected by the UE uniformly randomly from the set of carriers C before performing Type 1 channel access procedure on any carrier in the set of carriers C.

A eNB may indicate Type 2 channel access procedure in the DCI of an UL grant scheduling transmission(s) including PUSCH on a carrier in subframe $\gamma_i$ when the eNB has transmitted on the carrier according to the aforementioned channel access procedure for transmission(s) including the PDSCH/PDCCH/EPDCCH, or an eNB may indicate using the 'UL Configuration for LAA' field that the UE may perform a Type 2 channel access procedure for transmissions(s) including PUSCH on a carrier in subframe $\gamma_i$ when the eNB has transmitted on the carrier according to the aforementioned channel access procedure for transmission(s) including the PDSCH/PDCCH/EPDCCH, or an eNB may schedule transmissions including PUSCH on a carrier in subframe $\gamma_i$, that follows a transmission by the eNB on that carrier with a duration of $T_{short\_ul}=25$ us, if subframe $\gamma_i$ occurs within the time interval starting at $t_0$ and ending at $t_0+T_{CO}$, where $T_{CO}=T_{mcot,p}+T_g$, where
- $t_0$ is the time instant when the eNB has started transmission,
- $T_{mcot,p}$ value is determined by the eNB as described in the downlink channel access procedure,
- $T_g$ is the total duration of all gaps of duration greater than 25 us that occur between the DL transmission of the eNB and UL transmissions scheduled by the eNB, and between any two UL transmissions scheduled by the eNB starting from $t_0$.

The eNB shall schedule UL transmissions between $t_0$ and $t_0+T_{CO}$ in contiguous subframes if they can be scheduled contiguously.

For an UL transmission on a carrier that follows a transmission by the eNB on that carrier within a duration of $T_{short\_ul}=25$ us, the UE may use Type 2 channel access procedure for the UL transmission.

If the eNB indicates Type 2 channel access procedure for the UE in the DCI, the eNB indicates the channel access priority class used to obtain access to the channel in the DCI.

Hereinafter, a type-1 UL channel access procedure will be described.

The UE may transmit the transmission using Type 1 channel access procedure after first sensing the channel to be idle during the slot durations of a defer duration $T_d$; and after the counter N is zero in step 4. The counter N is adjusted by sensing the channel for additional slot duration(s) according to the steps described below.

1) set $N=N_{init}$, where $N_{init}$ is a random number uniformly distributed between 0 and $CW_p$, and go to step 4;
2) if $N>0$ and the UE chooses to decrement the counter, set $N=N-1$;
3) sense the channel for an additional slot duration, and if the additional slot duration is idle, go to step 4; else, go to step 5;
4) if $N=0$, stop; else, go to step 2.
5) sense the channel until either a busy slot is detected within an additional defer duration $T_d$ or all the slots of the additional defer duration $T_d$ are detected to be idle;
6) if the channel is sensed to be idle during all the slot durations of the additional defer duration $T_d$, go to step 4; else, go to step 5;

If the UE has not transmitted a transmission including PUSCH on a carrier on which LAA Scell(s) transmission(s) are performed after step 4 in the procedure above, the UE may transmit a transmission including PUSCH on the carrier, if the channel is sensed to be idle at least in a slot duration $T_{sl}$ when the UE is ready to transmit the transmission including PUSCH, and if the channel has been sensed to be idle during all the slot durations of a defer duration $T_d$ immediately before the transmission including PUSCH. If the channel has not been sensed to be idle in a slot duration $T_{sl}$ when the UE first senses the channel after it is ready to transmit, or if the channel has not been sensed to be idle during any of the slot durations of a defer duration $T_d$ immediately before the intended transmission including PUSCH, the UE proceeds to step 1 after sensing the channel to be idle during the slot durations of a defer duration $T_d$.

The defer duration $T_d$ consists of duration $T_f=16$ us immediately followed by $m_p$ consecutive slot durations where each slot duration is $T_{sl}=9$ us, and $T_f$ includes an idle slot duration $T_{sl}$ at start of $T_f$.

A slot duration $T_{sl}$ is considered to be idle if the UE senses the channel during the slot duration, and the power detected by the UE for at least 4 us within the slot duration is less than energy detection threshold $X_{Thresh}$. Otherwise, the slot duration $T_{sl}$ is considered to be busy.

$CW_p$ ($CW_{min,p} \leq CW_p \leq CW_{max,p}$) is a contention window. Applying of $CW_p$ is described in a contention window adjustment procedure to be described below.

$CW_{min,p}$ and $CW_{max,p}$ are chosen before step 1 of the procedure above.

$m_p$, $CW_{min,p}$, and $CW_{max,p}$ are based on the channel access priority class signaled to the UE as shown in Table 5.

Applying of $X_{Thresh}$ will be described in an energy detection threshold adaptation procedure to be described below.

Hereinafter, a type-2 UL channel access procedure will be described.

If the UL UE uses Type 2 channel access procedure for a transmission including PUSCH, the UE may transmit the transmission including PUSCH immediately after sensing the channel to be idle for at least a sensing interval $T_{short\_ul}$=25 us. $T_{short\_ul}$ consists of a duration $T_f$=16 us immediately followed by one slot duration $T_{sl}$=9 us and $T_f$ includes an idle slot duration $T_{sl}$ at start of $T_f$. The channel is considered to be idle for $T_{short\_ul}$ if it is sensed to be idle during the slot durations of $T_{short\_ul}$.

Hereinafter, a contention window adjustment procedure will be described.

If the UE transmits transmissions using Type 1 channel access procedure that are associated with channel access priority class p on a carrier, the UE maintains the contention window value $CW_p$ and adjusts $CW_p$ for those transmissions before step 1 of the aforementioned Type 1 uplink channel access procedure, using the following procedure:

if the NDI value for at least one HARQ process associated with HARQ_ID_ref is toggled,
  for every priority class $p \in \{1, 2, 3, 4\}$ set $CW_p = CW_{min,p}$.
otherwise, increase $CW_p$ for every priority class $p \in \{1, 2, 3, 4\}$ to the next higher allowed value;

HARQ_ID_ref is the HARQ process ID of UL-SCH in reference subframe $n_{ref}$. The reference subframe $n_{ref}$ is determined as follows:

If the UE receives an UL grant in subframe $n_g$, subframe $n_w$ is the most recent subframe before subframe $n_g$−3 in which the UE has transmitted UL-SCH using Type 1 channel access procedure.
  If the UE transmits transmissions including UL-SCH without gaps starting with subframe $n_0$ and in subframes $n_0, n_1, \ldots, n_w$, reference subframe $n_{ref}$ is subframe $n_0$,
  otherwise, reference subframe $n_{ref}$ is subframe $n_w$.

The UE may keep the value of $CW_p$ unchanged for every priority class $p \in \{1, 2, 3, 4\}$, if the UE scheduled to transmit transmissions without gaps including PUSCH in a set subframes $n_0, n_1, \ldots, n_{w-1}$ using Type 1 channel access procedure, and if the UE is not able to transmit any transmission including PUSCH in the set of subframes.

The UE may keep the value of $CW_p$ for every priority class $p \in \{1, 2, 3, 4\}$ the same as that for the last scheduled transmission including PUSCH using Type 1 channel access procedure, if the reference subframe for the last scheduled transmission is also $n_{ref}$.

If $CW_p=CW_{max,p}$, the next higher allowed value for adjusting $CW_p$ is $CW_{max,p}$.

If the $CW_p=CW_{max,p}$ is consecutively used K times for generation of $N_{init}$, $CW_p$ is reset to $CW_{min,p}$ only for that priority class p for which $CW_p=CW_{max,p}$ is consecutively used K times for generation of $N_{init}$. K is selected by UE from the set of values $\{1, 2, \ldots, 8\}$ for each priority class $p \in \{1, 2, 3, 4\}$.

Hereinafter, an energy detection threshold adaptation procedure will be described.

A UE accessing a carrier on which LAA Scell(s) transmission(s) are performed, shall set the energy detection threshold ($X_{Thresh}$) to be less than or equal to the maximum energy detection threshold $X_{Thresh\_max}$.

$X_{Thresh\_max}$ is determined as follows:
If the UE is configured with higher layer parameter 'maxEnergyDetectionThreshold-r14',
  $X_{Thresh\_max}$ is set equal to the value signalled by the higher layer parameter.
Otherwise,
  the UE shall determine $X'_{Thresh\_max}$ according to a default maximum energy detection threshold computation procedure to be described below.
  if the UE is configured with higher layer parameter 'energyDetectionThreshold/Offset-r14'
    $X_{Thresh\_max}$ is set by adjusting $X'_{Thresh\_max}$ according to the offset value signalled by the higher layer parameter,
  otherwise,
    The UE shall set $X_{Thresh\_max}=X'_{Thresh\_max}$.

Hereinafter, the default maximum energy detection threshold computation procedure will be described.

If the higher layer parameter 'absenceOfAnyOtherTechnology-r14' indicates TRUE:

$$X'_{Thresh\_max} = \min\left\{ \begin{array}{c} T_{max} + 10\,\text{dB}, \\ X_r \end{array} \right\}$$

where
  $X_r$ is Maximum energy detection threshold defined by regulatory requirements in dBm when such requirements are defined, otherwise $X_r=T_{max}+10$ dB.
Otherwise, $$X'_{Thres\_max} = \max\left\{ \begin{array}{c} -72 + 10 \cdot \log 10(BWMHz/20\,\text{MHz})\,\text{dBm}, \\ \min\left\{ \begin{array}{c} T_{max}, \\ T_{max} - T_A + (P_H + 10 \cdot \log 10(BWMHz/20\,\text{MHz}) - P_{TX}) \end{array} \right\} \end{array} \right\}$$

Where,
$T_A$=10 dB;
$P_H$=23 dBm;
$P_{TX}$ is the set to the value of $P_{CMAX\_H,c}$;
$T_{max}$ (dBm)=10·log 10 (3.16228·$10^{-8}$ (mW/MHz)·BWMHz (MHz));
BWMHz is the single carrier bandwidth in MHz.

Hereinafter, the present disclosure will be described.

The present disclosure proposes a multi-beam based listen-before-talk method and a contention window size adjustment scheme, when a transmission node performs a channel access procedure in a wireless communication system including a base station (BS) and a user equipment (UE) in an unlicensed band.

With a growing demand on higher communication capacity in many communication devices, effective utilization of a limited frequency band is increasingly more important in a next-generation wireless communication system. In a cellular communication system such as an LTE/NR system, an unlicensed band which is the same as a 2.4 gigahertz (GHz) band used generally by the legacy WiFi system or an unlicensed band which is the same as a 5 GHz and 60 GHz band getting new attention is considered to be utilized in traffic offloading.

Since it is assumed basically in the unlicensed band that wireless transmission/reception is achieved in a contention-based manner among respective communication nodes, it is required to perform channel sensing before the respective communication nodes transmit signals, so as to confirm that signal transmission is not achieved in other communication nodes. For convenience, such an operation is called a listen before talk (LBT), and in particular, an operation of confirming whether another communication node transmits a signal is defined as carrier sensing (CS). When it is determined that another communication node does not transmit the signal, this is defined such that a clear channel assessment (CCA) is confirmed.

An eNB or UE of an LTE/NR system must also perform the LBT for signal transmission in the unlicensed band (for convenience, referred to as a U-band). Further, when the eNB or UE of the LTE/NR system transmits a signal, another communication node such as WiFi or the like must also perform the CCA to prevent interference. For example, in a WiFi standard (801.11ac), a CCA threshold is defined as −62 dBm as to a non-WiFi signal and is defined as −82 dBm as to a WiFi signal. This means that an STA or an AP does not transmit a signal to prevent interference, for example, when a signal other than the WiFi signal is received with power greater than or equal to −62 dBm.

Meanwhile, a multi-beam operation may also be utilized in an NR U-band, similarly to a case where a plurality of antenna elements are used in millimeter wave (mmW) of NR to increase a beamforming (BF) gain, thereby increasing coverage or increasing a throughput. However, for coexistence of an NR system operating in an unlicensed band (e.g., 5 GHz, 37 GHz, 60 GHz) and another system (e.g., 802.11ac/ax/ad/ay. etc.), a multi-beam LBT operation shall be performed first before a transmission node performs transmission. When a channel is occupied by the LBT operation and transmission is performed through the occupied channel, LBT methods may be different when transmission is performed while performing beam sweeping on multiple analog beams and when transmission is performed by fixing the beams as a single analog beam.

In addition, when NACK of at least a specific ratio is reported for data transmitted by a plurality of UEs which have succeed in LBT in a specific slot, CWS adjustment may also be required in an NR U-band, similarly to a case of increasing a contention window size (CWS). NR is a system in which UEs having various bandwidth capabilities coexist. A UE capable of performing transmission/reception through the entire carrier bandwidth in the entire carrier bandwidth and a UE supporting only a partial bandwidth in the carrier bandwidth may coexist. A subset consisting of a part of a physical resource block (PRB) consecutive in the carrier bandwidth is referred to as a bandwidth part (BWP). Up to 4 BWPs may be configured for the UE through a higher layer signal. The UE performs transmission/reception only with an active BWP among the configured BWP at a specific timing, and does not expect to receive a PDSCH, a PDCCH, a CSI-RS, a TRS, or the like in a region other than the active BWP. As such, since it is an environment where UEs having different bandwidth capabilities coexist, NACK for a PDSCH scheduled to a plurality of BS LBT BWPs in an overlap/overlaid manner in one slot needs to be properly calculated by considering a BWP of the UE and the LBT bandwidth of the BS, thereby adjusting the CWS when NACK of at least a specific ratio occurs.

For example, considering a situation where an LBT bandwidth 1 and LBT bandwidth 2 of the BS are set to 20 MHz consecutively on a frequency axis and a UE A has a 40 MHz bandwidth capability and completely overlaps with the LBT bandwidth of the BS, a PDSCH across two BS LBT bandwidths may be scheduled through a BWP of the UE in one slot. In this case, when the scheduled PDSCH fails in decoding and thus NACK is reported to the BS, the BS shall determine which one of the LBT bandwidth 1 and the LBT bandwidth 2 will be considered for NACK to adjust the CWS.

Accordingly, the present disclosure proposes an LBT method for a case where transmission is performed while sweeping several analog beams when a channel is occupied after LBT is performed and the occupied channel is used for transmission, and an LBT method for a case where transmission is performed while fixing to a single analog beam. In addition, the present disclosure proposes a method of adjusting a CWS for each LBT bandwidth when UEs having different BWP capabilities coexist and a PDSCH is scheduled by overlapping with a plurality of LBT bandwidths of the BS.

Hereinafter, in the present disclosure, a physical broadcast channel (PBCH) implies a physical channel transmitting basic system information (hereinafter, MIB (master information block) such as a system band, SFN (system frame number), or the like. RMSI (remaining minimum system information) implies system information required for an any/random access procedure or the like, other than the MIB. OSI (other system information) implies the remaining system information, other than the MIB and the RMSI. In addition, SS (synchronization signal) implies a synchronization signal, DM-RS (demodulation reference signal) implies a reference signal for data demodulation, and a slot implies a basic time unit consisting of a plurality of OFDM symbols.

First, multi-beam LBT will be described hereinafter in greater detail.

A beamforming technique utilizing multiple antennas in an NR system is also considered in an NR U-band as one of essential parts. In an unlicensed band, listen-before-talk (LBT) shall be performed for fair coexistence with a Wi-Fi device or the like which previously exists on a corresponding band before a transmission node transmits data or the like (before performing medium access). In order to transmit a signal while performing beam sweeping in the NR U-band, the following multi-beam LBT methods may be considered.

First, in a method in which LBT is performed on a signal to be transmitted by performing beam sweeping after wide beam LBT is performed such as an SS block or the like, the transmission node may operate by selecting one of the following three methods. A UE may operate when one of the three methods is signaled from a BS.

(1) Method in which transmission is performed while sweeping a beam omni-directionally after performing LBT omni-directionally one time.

The method (1) is a method of performing omni-direction LBT other than a specific direction, even if transmission in a specific beam direction is introduced in NR.

(2) Method in which transmission is performed by sweeping a beam only in a beam direction in which LBT succeeds after performing LBT omni-directionally one time, or a method in which transmission is performed by sweeping all beams only when beam LBT succeeds for all directions whereas transmission is not attempted when LBT fails even for one beam direction In regards to the method (2), for example, it may be considered a case where the omni-direction is divided into four different beam directions (e.g., a beam direction 1, a beam direction 2, a beam direction 3, a beam direction 4), and LBT is performed for each of the different beam directions. Herein, in a case where the method (2) is applied, when LBT succeeds only for the beam direction 1 and the beam direction 3, the transmission node may perform transmission only for the beam direction 1 and the beam direction 3. Alternatively, since the LBT has failed for some beam directions, transmission on all beam directions may not be performed.

(3) Method in which directional LBT is performed in the remaining directions except for a beam direction in which transmission is not performed in practice, and transmission is attempted by performing beam sweeping in a beam direction in which LBT succeeds.

For example, in case of the aforementioned example of the method (2), it is possible to consider a case where the transmission node does not actually perform transmission based on the beam direction 4. In this case, the transmission node may perform LBT only for the beam direction 1, the beam direction 2, and the beam direction 3. Herein, when LBT succeeds only for the beam direction 1 and the beam direction 3 as described above, the transmission node may perform transmission only for the beam direction 1 and the beam direction 3.

Hereinafter, methods proposed in the present disclosure will be described in regards to multi-beam LBT.

[Proposed method #1] Method in which an LBT (CCA) slot duration required when performing LBT of the method (1) is set to be longer than a time of specific directional LBT of the method (2) so that a total time required in LBT is similar.

For example, if T is an LBT (CCA) slot duration required to perform LBT in a specific direction, and the total number of beams to be subjected to LBT is 4 and thus a time of 4 T is required in total to perform LBT for each beam, then when LBT is performed omni-directionally one time, an LBT slot duration may be a value (e.g., 4 T) greater than the LBT time T required for each beam.

The [Proposed Method #1] considers a relationship between the omni-directional LBT and the directional LBT as a method in which a product of a time required to perform the directional LBT for each direction and the total number of directions split for the omni-direction is set to be similar or equal to a time required to perform the omni-directional LBT.

Meanwhile, in case of the method (2), an index of a beam to be transmitted in practice may have to be dynamically indicated to a reception node since transmission is performed only in a beam direction in which directional LBT succeeds.

[Proposed method #2] Method in which an SRS resource, such as beam management SRS, containing information of a beam direction in which LBT succeeds is transmitted in an uplink in the beam direction to inform a reception node of a beam direction in which the LBT succeeds in practice.

That is, according to the [Proposed Method #2], the transmission node may report information on the beam direction to a reception node in a beam direction in which LBT succeeds, so that the reception node can more easily recognize the beam direction in which LBT succeeds, thereby more smoothly performing a reception operation related to the beam direction.

Herein, however, the beam direction may be replaced with a resource region scheduled to be transmitted, and the SRS resource implies a time-frequency resource on which a BS indications SRS transmission.

For example, assuming that there are three beam directions #1, #2, and #3 in which LBT shall be performed from a perspective of a transmission node, it is possible that a sequence A and/or a frequency resource 1 are transmitted when LBT succeeds in all beam directions, a sequence B and/or a frequency resource 2 are transmitted when LBT succeeds in the beam directions #1 and #2 or the beam directions #2 and #3 or the beam directions #1 and #3, and a sequence C and/or a frequency resource 3 are transmitted when LBT succeeds only in one direction out of the three directions. Of course, a sequence may be configured differently for all cases obtained from the LBT result. Therefore, when a corresponding SRS resource is transmitted in a beam direction in which LBT succeeds according to a directional LBT result, a reception node may know information on a beam direction in which LBT succeeds in practice.

In addition, when repetitive transmission is indicated from a BS in the same beam direction, there is a need to inform the BS of a specific resource on which transmission starts in practice. For example, assume that the BS indicates repetitive transmission three times in a specific beam direction, and respective transmission attempt orders are denoted by a first order, a second order, and a third order. In this case, if information regarding at which order a corresponding signal is transmitted together when LBT succeeds for a corresponding direction, the BS may know at which order the LBT succeeds among the three times of repetitive transmission.

[Proposed method #3] Method in which information regarding a beam direction in which LBT succeeds as a result of performing LBT is included together and informed to a reception node through a PUCCH (PDCCH) or PUSCH (PDSCH) while transmitting a signal in a beam direction in which LBT succeeds as a result of performing directional LBT.

In other words, information on the beam direction in which LBT succeeds is transmitted through PUCCH/PUSCH/PDCCH/PDSCH, similarly to the aforementioned [Proposed Method #2].

Meanwhile, in the method (2), a beam of a specific direction in which LBT fails may be produced while performing directional LBT. In this case, the following methods may be considered as a detailed operation of multi-beam LBT.

[Proposed method #4] Method in which, when LBT of a specific direction fails, LBT of a next direction is performed with a delay corresponding to a time required to transmit a signal in a corresponding direction (after LBT is completely finished) or transmission in all directions are discarded.

Figure 12:
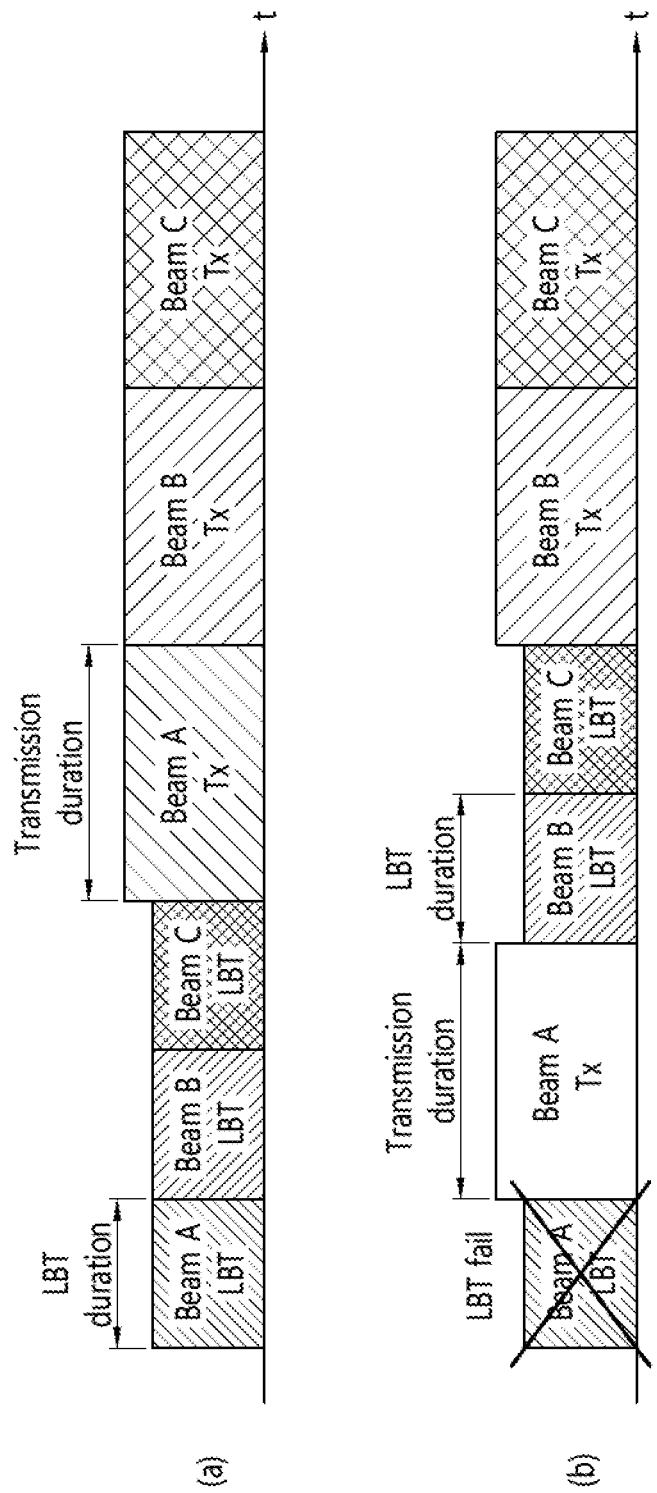
FIG. 12 schematically shows LBT performed for each beam.

FIG. 12 schematically shows LBT performed for each beam. Herein, FIG. 12 shows an example for a case where there are three beams, i.e., a beam A, a beam B, and a beam C. FIG. 12(a) shows a transmission procedure for each beam after LBT is normally performed for each beam when LBT succeeds for all beams, and FIG. 12(b) shows a transmission procedure when LBT fails for the beam A.

For example, when the directional LBT is performed sequentially in three directions, the transmission procedure performed after the normal LBT is an operation in which the directional LBT is performed sequentially from the beam A to the beam C as shown in FIG. 12(a) and thereafter transmission is performed for each beam in the same order. However, if LBT fails for the beam A, since it is known that signal transmission is not performed in a direction of the beam A after completion of the LBT in all directions, the LBT may be performed with a delay corresponding to a time required for signal transmission when the LBT in the direction of the beam A succeeds instead of immediately performing the LBT for a next beam, i.e., the beam B, as shown in FIG. 12(b).

Herein, for example, when a specific node fails in LBT for the beam A and succeeds in LBT for the beams B and C, if transmission for beams in which LBT succeeds is delayed during a transmission time duration for the beam A after LBT is performed on all beams as shown in FIG. 12(a) (i.e., if transmission for the beam A is not performed during the transmission time duration for the beam A shown in FIG. 12(a)), another node may success in LBT and thus be able to transmit a signal during the time duration. Therefore, even if the specific node succeeds in LBT for the beams B and C and thus transmits a signal thereof, interference may occur due to the signal transmission of another node.

In order to solve this problem, there is a method to be considered in which, when LBT fails for the beam A as shown in FIG. 12(b), a gap corresponding to a transmission time duration for the beam A is configured before performing LBT for the beams B and C so that the LBT operation for the beams B and C is performed after the gap. That is, in this method, the LBT operation for the beams B and C is delayed by the transmission time duration when LBT for the beam A fails.

In addition, herein, in case of FIG. 12(b), when LBT in a direction of the beam A fails, the specific node which has performed the LBT during a time duration in which signal transmission is delayed may not perform any operation.

Meanwhile, herein, when an LBT failure in a specific direction occurs in an intermediate direction other than a first direction or a last direction of LBT for all directions, the following two options may be considered.

Option 1: Method in which, when an LBT order is determined for each direction and LBT for a specific direction fails while sequentially performing the LBT, the LBT is delayed temporarily for a time required for transmission of the remaining beams when the LBT succeeds and a signal is transmitted only in a direction in which the LBT succeeds.

Option 2: even if LBT for an intermediate direction fails, the LBT is completely performed in next directions, and a signal may be transmitted only in directions in which the LBT succeeds continuously. For example, if LBT fails only for a direction #3 among 6 directions in total, according to a pre-configuration or agreement, a transmission node may transmit a signal selectively in front directions #1 and #2 in which the LBT succeeds continuously or subsequent directions #4, #5, and #6 in which the LBT succeeds continuously.

[Proposed method #5] Method in which beams for performing directional LBT are grouped to apply the aforementioned methods within a corresponding group.

For example, if there are 6 beams #1 to #6 for performing directional LBT, the beams may be paired so that each of two beams are set as one group. Herein, the [Proposed method #4] may be applied not to an individual beam but to a group beam to perform directional LBT. For a failed group beam, next LBT may be performed on the group beam by being temporarily delayed by a transmission time. A signal may be transmitted only in a group beam direction in which LBT succeeds.

According to the [Proposed Method #5], each of beam directions in the aforementioned [Proposed Method #1] to [Proposed Method #4] may be applied by being configured as a beam group.

Next, when a signal is transmitted with a narrow beam after narrow beam LBT is performed similarly to DL data or the like, an LBT execution procedure based on random back-off is required in an LBT process for each beam.

[Proposed method #6] LBT method based on individual random back-off for each beam direction.

In this method, a back-off counter may be individually set for each beam direction. When a transmission node changes a direction of a beam for performing LBT to a specific beam direction A in the middle of performing LBT based on random back-off, the back-off counter of the existing beam direction A may be held temporarily and the LBT may be performed in another beam direction. When the LBT is performed returning to the beam direction A, the held counter value may be increased by a predetermined or agreed specific value. In this case, a penalty may be added. The penalty may start from the same value as the counter value which starts to decrease or which is held, and may additionally start to decrease the counter only in an idle state during a specific time.

The [Proposed Method #6] proposes a method of configuring an individual per-beam random back-off counter for each beam direction by considering a per-beam operation introduced in NR in the existing LBT scheme based on the random back-off counter, and configuring and changing the per-beam random back-off counter when the per-beam LBT operation is performed.

[Proposed method #7] Method of performing LBT based on random back-off even for broadcast data transmitted while performing beam sweeping after wide beam LBT, similarly to SS block/RMSI/OSCI/paging or the like.

In regards to the [Proposed Method #7], LBT schemes as shown in Table 6 below may be applied, in COT initiation performed by a gNB. Herein, methods disclosed in Table 6 below are only one example, and various methods different from Table 6 may be considered.

TABLE 6

| COT(channel occupancy time) initiation | | | |
|---|---|---|---|
| | channel/signal | Cat. 2 LBT | Cat. 4 LBT |
| DL | DRS(Discovery Reference Signal) alone or DRS multiplexed with non-unicast data (e.g., OSI, paging, RAR) | When DRS duty cycle ≤ 1/20, and total duration is up to 1 ms: - 25 μs Cat 2 LBT i used (the same as in LAA) | When DRS duty cycle ≥ 1/20, or total duration > 1 ms |

TABLE 6-continued

| COT(channel occupancy time) initiation channel/signal | Cat. 2 LBT | Cat. 4 LBT |
|---|---|---|
| DRS multiplexed with unicast data | Not applicable, when excluding exceptions of the following note | Channel access priority class is selected depending on multiplexed data. |
| PDCCH and PDSCH | Not applicable, when excluding exceptions of the following note | Channel access priority class is selected depending on multiplexed data. |

Note:
initial/random access, mobility, paging, transmission of only reference signals, and transmission of only PDCCH (e.g., RACH message 4), handover command, GC-PDCCH, or applicability of LBT scheme other than cat. 4 regarding short message paging-related control messages transmitted alone or multiplexed with DRS Meanwhile, the existing wide beam LBT is a method of performing LBT one time omni-directionally or in a specific direction and thereafter performing transmission in a corresponding direction when the LBT succeeds, whereas the proposed method is a method of performing LBT based on random back-off such as DL data or the like when the LBT is performed. However, in order for a signal transmitted through beam sweeping to finish contention faster than DL data, a CWS may be set to be smaller than that of narrow beam LBT, or an LBT slot duration may be set to be short, or a CCA threshold may be increased, so that a time required until medium access (MA) is performed is set to be relatively small.

In addition, the proposed method is also applicable to an uplink such as an SRS or the like. A method applied to a beam management SRS may be considered as a representative example thereof.

In other words, the existing LBT methods include a type-1 method which is an LBT method based on a random back-off counter and a type-2 method which is an LBT method performed without the random back-off counter. In the type-1 method, a transmission signal is transmitted by including a PDSCH in the transmission signal, whereas in the type-2 method, the transmission signal is transmitted without including the PDSCH. That is, the type-2 method is used when non-unicast data is transmitted. Meanwhile, the type-1 method may also be referred to as category 4 (or cat. 4) LBT, and the type-2 method may also be referred to as category 2 LBT (or cat. 2).

Herein, the [Proposed Method #7] considers the use of the LBT method based on the random back-off counter rather than the type-2 method even if non-unicast data is transmitted. In addition, in the [Proposed Method #7], whether to apply the LBT method based on the random back-off counter may vary depending on a type or configuration of the non-unicast data.

[Proposed method #8] Method in which LBT is performed by scaling a CCA threshold value or an energy value measured for CCA by a ratio of a specific beam intending to perform transmission among all beams when transmission is performed only in a specific beam direction.

First, when performing omni-directional LBT, if the measured energy value is P, the existing method performs transmission by comparing the measured energy value P and the CCA threshold value T and by considering that a channel is idle only when P<T. However, this method may determine that a channel is idle if P*R<T as a result of scaling the measured energy value P with a ratio R (where R is a rational number satisfying 0<R≤1) of a beam to be transmitted in all directions, or may determine that the channel is idle if P<T/R as a result of scaling the CCA threshold value.

Scaling based on a ratio of a beam is considered in this method when the measured power/energy value and the threshold are compared by considering fairness with the omni-directional LBT in case of introducing the directional LBT.

Hereinafter, a method of adjusting a CWS for each BWP will be described in greater detail.

The existing LAA includes a CWS adjustment method. In this method, bandwidth capability of UEs is up to 20 MHz, which is the same as an LBT bandwidth of a BS. When the BS intends to transmit downlink (DL) data through 5 consecutive slots after LBT succeeds, for example, a PDSCH for 10 UEs is scheduled in a first slot of a DL burst. At least 8 NACKs are reported from the UEs, so that LBT is performed again by increasing a CWS when an NACK ratio is greater than or equal to 80%.

However, in NR, a UE capable of performing transmission/reception by using the entire carrier bandwidth (up to about 400 MHz) according to bandwidth capability of the UE may coexist with UEs capable of performing transmission/reception only through a subset (e.g., BWP) having a bandwidth smaller than a carrier bandwidth.

Figure 13:
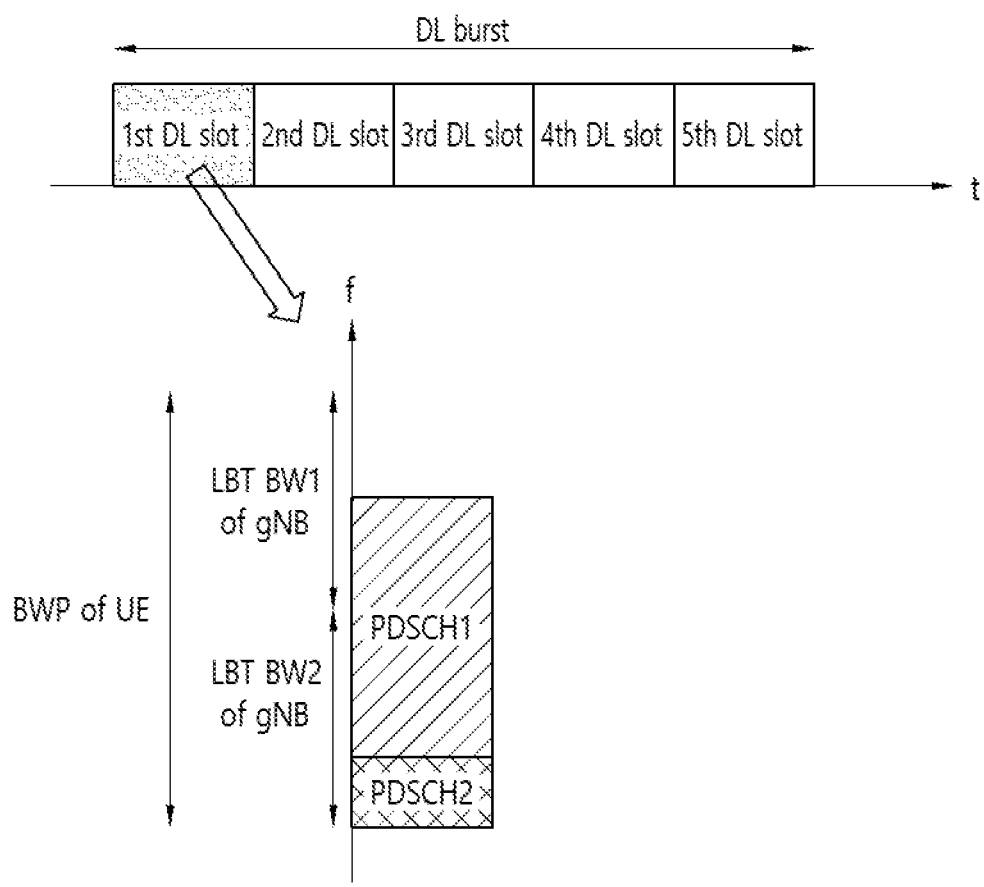
FIG. 13 schematically shows PDSCH scheduling in a situation where a BWP configured for a UE is greater than an LBT bandwidth.

FIG. 13 schematically shows PDSCH scheduling in a situation where a BWP configured for a UE is greater than an LBT bandwidth.

FIG. 13 schematically shows LBT bandwidths (BWs) 1 and 2 of a gNB and a BWP of a UE. Herein, for example, two LBT BWs 1 and 2 may overlap with one BWP of the UE. Herein, each of the LBT BWs 1 and 2 may be 20 MHz. In addition, herein, the BWP of the UE may be 40 MHz.

In this situation, FIG. 13 schematically shows a situation where a PDSCH 1 and a PDSCH 2 are allocated. Herein, as shown in FIG. 13, it may be considered a case where the PDSCH 1 is allocated across an LBT BW 1 and an LBT BW 2, and the PDSCH 2 is allocated only to the LBT BW 2.

As shown in FIG. 13, the UE which has a BW corresponding to a value obtained by adding the LBT BW 1 and LBT BW 2 of the gNB as a BWP may be configured by fully overlapping with the two LBT BWs of the gNB, and a PDSCH across the two gNB LBT BWs may be scheduled. In this case, a NACK ratio which is a criterion for CWS adjustment of the LBT BW 1 and LBT BW 2 of the gNB may be calculated by the following proposed methods.

[Proposed method #9] Method of adjusting CWs of LBT BW according to BWP of UE.

In this method, for an LBT BW overlapping with a BWP of a UE among LBT BWs of a gNB, all PDSCHs scheduled to a BWP of a UE are considered for a NACK ratio to adjust a CWS. For example, when the BWP of the UE overlaps with the LBT BW 1 and LBT BW 2 of the gNB as shown in FIG. 13, all PDSCHs, i.e., both the PDSCH 1 and the PDSCH 2, scheduled to the BWP of the UE are considered for NACK counting of the LBT BW 1 and the LBT BW 2 so as to contribute to an increase in a CWS when greater than or equal to a specific NACK ratio.

[Proposed method #10] Method of adjusting CWS of LBT BW according to PDSCH scheduled resource.

In this method, when a resource scheduled with a PDSCH belongs to a specific gNB LBT BW, NACK of the PDSCH is considered when a CWS of a corresponding LBT BW is adjusted. For example, in FIG. 13, since a PDSCH 2 belongs to only an LBT BW of the gNB, NACK of the PDSCH 2 may be considered only for CWS adjustment of the LBT BW 2. In case of a PDSCH 1, since a scheduled resource belongs to both the LBT BW 1 and the LBT BW 2, if a decoding result of the PDSCH 1 is NACK, it may be considered for both the two LBT BWs and thus be used in CWS adjustment. Alternatively, it may be considered only for CWS adjustment of an LBT BW having a greater proportion of a PDSCH 1 resource among the two LBT BWs.

Specifically, in case of the PDSCH 1 of FIG. 13, for example, all resources scheduled for the PDSCH 1 may be allocated with a ratio of 40% for the LBT BW 1, and may be allocated with a ratio of 60% for the LBT BW 2. In this case, according to the [Proposed Method #10], if a decoding result of the PDSCH 1 is NACK, the decoding result may be considered for CWS adjustment for each BW by considering a 40:60 ratio which is a ratio of resources allocated to the LBT BW1 and the LBT BW 2, or the decoding result may be considered only for CWS adjustment for the LBT BW 2 having a higher ratio of allocated resources.

[Proposed method #11] Method of adjusting CWS of UE LBT BW in uplink data transmission similarly to PUSCH.

This method relates to how to apply a PUSCH transmission result to CWS adjustment of each of the LBT BWs 1 and 2 of the UE, when the UE transmits a UL burst by succeeding in LBT in each LBT BW in a situation where a DL BW of the UE of FIG. 13 is changed to a UL BW, a PDSCH is changed to a PUSCH, and LBT BWs 1 and 2 of the gNB are changed to LBT BWs 1 and 2 of the UE. That is, the aforementioned methods may also equally apply to an uplink.

Specifically, as one method, there is a method in which a CWS is adjusted by considering a PUSCH transmission result, i.e., NACK, for each of the LBT BWs 1 and 2 when the UL BW of the UE overlaps with the LBT BW of the UE as in the [Proposed Method #9].

As another method, there is a method in which a CWS is adjusted by considering a transmission result for an LBT BW thereof when a corresponding PUSCH transmission resource is scheduled in a specific LBT BW, based on a resource scheduled for a PUSCH of a UE, as in the [Proposed Method #10]. Similarly, a PUSCH transmission result for a case where PUSCH transmission resources are scheduled across both the two LBT BWs of the UE may be considered for CWS adjustment of the two LBT BWs, or may be considered only for CWS of an LBT BW having a greater proportion of a PUSCH resource.

[Proposed method #12] Method of setting CWS and/or back-off counter value when BWP is switched.

The gNB may activate at least one DL/UL BWP (through L1 signaling or MAC CE or RRC signaling or the like) among configured DL/UL BWP(s) at a specific timing for the UE. Further, switching to another configured DL/UL BWP may be indicated (through L1 signaling or MAC CE or RRC signaling or the like) or switching to a determined DL/UL BWP may be achieved at the expiry of a timer value based on a timer. As such, when the DL/UL BWP is switched, a maximum CWS and/or back-off counter value applied to a BWP before switching or a BWP after switching may be reset or maintained.

Specifically, when the BWP is switched by the timer or the signaling as described above, the CWS and back-off counter value of the UE may be adjusted according to the following options.

Option 1: Reset to minimum CWS value of all priority classes

Herein, the priority class may be the channel access priority classes of Table 4 and Table 5. Specifically, taking the channel access priority class of Table 4 for example, if the channel access priority class is 3, a CWS for a switched BWP may be reset to 15 which is the minimum value among {15, 31, 63}.

Option 2: Maintain CWS used in previous BWP

Option 3: Use new CWS indicated by downlink control information (DCI)

That is, the option 3 is for a method in which a CWS for a BWP after switching is indicated together, while indicating switching of the BWP through DCI.

Option 4: Change to CWS of one step before

Option 5: Use CWS value used in previous corresponding BWP

Herein, taking the channel access priority class of Table 4 for example as described above, if the channel access priority class is 3 for specific data and a CWS for a BWP before switching has a size of 31, according to the option 4, if the channel access priority class is 3, a CWS for a BWP after switching is 15 which is a CWS one step before. Further, according to the option 5, if the channel access priority class is 3, then 31 is directly used.

[Proposed Method #13] Method in which, when an LBT failure occurs persistently more than a specific time in DL/UL LBT within one BWP, DL/UL LBT switches to another BWP, and CWS and back-off counter values are adjusted as in the [Proposed Method #12]

When an LBT failure occurs persistently more than a specific time or more than a specific count (herein, the specific time or count may be a timer-based value or a pre-configured value) in a DL or UL LBT at a BWP where the UE resides at present, the DL/UL LBT may be performed at a corresponding BWP by switching to a pre-agreed or configured specific BWP. Herein, the pre-agreed or configured BWP may be a BWP before switching or an initial/default BWP. As such, when the UE performs switching on the BWP, a CWS value may be adjusted as in the [Proposed Method #12].

In particular, if a gNB indicates to a UE the BWP switching and PUSCH transmission for uplink at the switched BWP but the UE fails in LBT at the switched BWP and thus fails in PUSCH transmission, from a gNB perspective, it may be ambiguous whether the UE fails to properly receive a BWP switching indication or fails in transmission due to a failure in LBT, and a BWP/resource transmitted by the UE and a BWP/resource expected by the gNB may be misaligned. In this case, similarly to the above description, the UE may switch to a pre-agreed or configured specific BWP, and may adjust a CWS value as in the [Proposed Method #12]. Herein, the pre-agreed or configured BWP may be a BWP before switching or an initial/default BWP. By configuring such a rule or method, when the UE switches to a pre-agreed or configured BWP, the gNB may recognize without ambiguity whether the UE has not succeeded in LBT or has not received a switching indication of the BWP.

Figure 14:
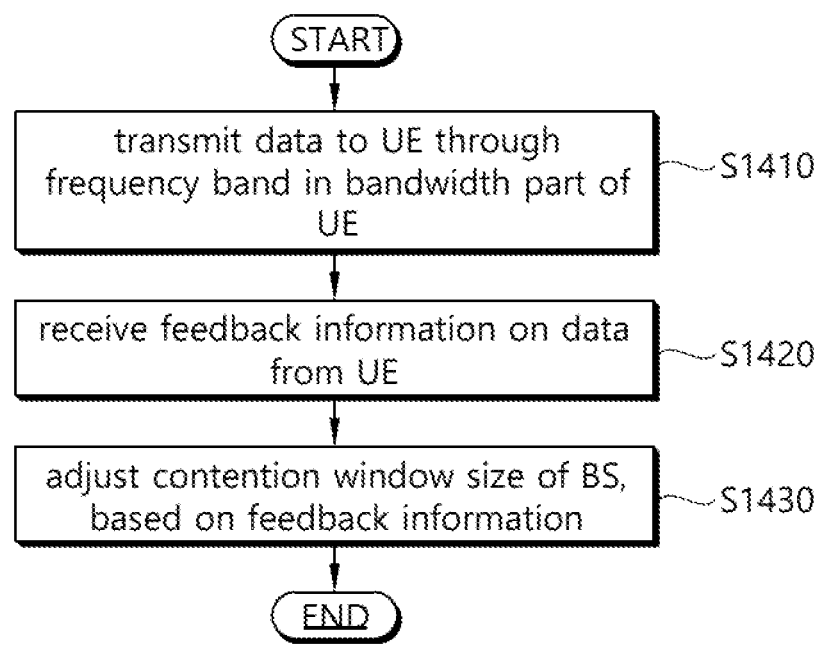
FIG. 14 is a flowchart for a contention window size adjustment method of a BS according to an embodiment of the present disclosure.

FIG. 14 is a flowchart for a contention window size adjustment method of a BS according to an embodiment of the present disclosure. Herein, the BS may include the aforementioned eNB or gNB.

Referring to FIG. 14, the BS transmits data to a UE through a frequency band in a bandwidth part of the UE (S1410). Herein, the bandwidth part may be one part of a carrier bandwidth configured for the UE.

Thereafter, the BS receives feedback information on the data from the UE (S1420).

Thereafter, the BS adjusts the contention window size of the BS, based on the feedback information (S1430). Herein, the contention window size may be in the range of a counter value used in a channel access procedure (CAP) as an operation in which the BS determines channel occupancy.

Herein, the bandwidth part may overlap with a plurality of CAP bandwidths in which the BS performs the CAP. A detailed example thereof may be the same as shown in FIG. 13. Meanwhile, although FIG. 13 shows only an example in which two CAP bandwidths of the BS overlap with a bandwidth part of a UE, it is also possible that one CAP bandwidth of the BS overlaps with the bandwidth part of the UE. Alternatively, the CAP bandwidth of the BS may have the same size as the bandwidth part. Alternatively, three or more CAP bandwidths of the BS may overlap with the bandwidth part of the UE.

In addition, herein, when the frequency band in which the data is transmitted overlaps with the plurality of CAP bandwidths, the BS may adjust a contention window size for at least one of the plurality of CAP bandwidths, based on the feedback information. Specifically, the contention window size may be adjusted for all of a plurality of overlapping CAP bandwidths as in the [Proposed Method #9]. Further, the contention window size may be adjusted only for a CAP bandwidth in which relatively more resources are allocated/included for the data.

Figure 15:
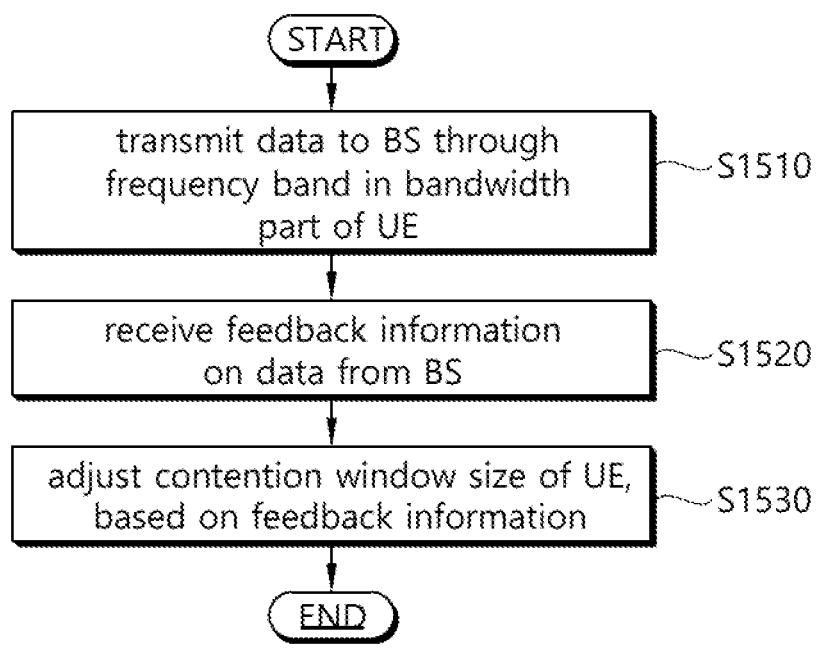
FIG. 15 is a flowchart for a contention window size adjustment method of a UE according to another embodiment of the present disclosure.

FIG. 15 is a flowchart for a contention window size adjustment method of a UE according to another embodiment of the present disclosure.

Referring to FIG. 15, the UE transmits data to a BS through a frequency band in a bandwidth part of the UE (S1510). Herein, the bandwidth part may be one part of a carrier bandwidth configured for the UE.

Thereafter, the UE receives feedback information on the data from the BS (S1520).

Thereafter, the UE adjusts the contention window size of the UE, based on the feedback information (S1530). Herein, the contention window size may be in the range of a counter value used in a channel access procedure (CAP) as an operation in which the BS determines channel occupancy.

Herein, the bandwidth part may overlap with a plurality of CAP bandwidths in which the UE performs the CAP. A detailed example thereof may be the same as that described in the [Proposed Method #11]. Meanwhile, although FIG. 13 and the [Proposed Method #11] show only an example in which two CAP bandwidths of the UE overlap with a bandwidth part of the UE, it is also possible that one CAP bandwidth of the UE overlaps with the bandwidth part of the UE. Alternatively, the CAP bandwidth of the UE may have the same size as the bandwidth part. Alternatively, three or more CAP bandwidths of the UE may overlap with the bandwidth part of the UE.

In addition, herein, when the frequency band in which the data is transmitted overlaps with the plurality of CAP bandwidths, the UE may adjust a contention window size for at least one of the plurality of CAP bandwidths, based on the feedback information.

Meanwhile, FIG. 14 and FIG. 15 relate to a contention window size adjustment of a BS and a UE, respectively. Although each of the aforementioned [Proposed Method #9] to [Proposed Method #13] is written based on any one of a UE perspective and a BS perspective, the proposed methods may be applied to both the BS and the UE. In addition, the CAP and CAP bandwidth described in FIG. 14 and FIG. 15 may have the same meaning as listen before talk (LBT) and an LBT bandwidth, respectively.

Hereinafter, a method of performing LBT by considering a gap between an LBT success timing and an actual transmission timing will be described in greater detail.

As the concept of a bandwidth part (BWP) is introduced in NR, a bandwidth of a BWP configured for a BS or a UE in an unlicensed band may be at least 20 MHz. In this case, LBT shall succeed, and a bandwidth in which LBT is performed may be multiplies of 20 MHz, i.e., 20 MHz*N (where N is a natural number).

Herein, when LBT succeeds only for a partial bandwidth out of the entire bandwidth, a transmission node may delay transmission until LBT succeeds for the entire bandwidth or may perform transmission only with the partial bandwidth in which LBT succeeds. An RF chain may be changed in a process in which the transmission node changes a transmission bandwidth, or an additional operation may be necessary to satisfy a requirement such as in-band/out-of-band emission and/or frequency domain spectral mask or the like according to an actual transmission bandwidth.

[Proposed Method #14] Method of performing transmission when a channel is idle after performing short LBT again for a bandwidth in which LBT has already succeeded immediately before transmission if there is a time gap between an LBT success timing and an actual transmission start timing, when LBT succeeds only for a partial bandwidth out of the entire bandwidth and thus transmission is performed by changing a transmission bandwidth to a bandwidth in which LBT succeeds However, the short LBT implies LBT which allows a transmission attempt upon determining that a channel is idle after performing LBT during a specific time (e.g., 25 us). In addition, in the proposed method, LBT may be performed with multiples of 20 MHz, i.e., 20 MHz*N (where N is a natural number).

However, the proposed method may apply only for a case where a time required when the transmission node changes the transmission bandwidth is greater than or equal to a specific time. In particular, a time required to change the transmission bandwidth may vary depending on UE or gNB capability. In addition, the time required to the change may vary depending on a relationship between the entire bandwidth and the transmission bandwidth (for example, when a size between the entire bandwidth and the transmission bandwidth is greater than or equal to a threshold).

In a process of changing the transmission bandwidth to a size of a bandwidth in which LBT succeeds, as described above, the requirement such as the change in the operating bandwidth of the RF chain may cause the time gap between the actual transmission timing and the LBT success timing. Herein, when channel sensing is impossible due to the change in the RF bandwidth, a channel may suddenly become a busy state by neighboring another node when transmission is performed after a corresponding time. Therefore, short LBT may be performed again to start transmission only when confirming that the channel is idle.

For example, when a BW of a BWP is 80 MHz, if 4 LBT BWs in unit of 20 MHz are BW #1, BW #2, BW #3, and BW #4 in an ascending order of frequency, there may be a case where 20 MHz-unit LBT succeeds for the BW #1 and the BW #2 and fails for the BW #4.

In this case, a transmission node may re-configure a transmission bandwidth to 40 MHz, and may perform short LBT in unit of 20 MHz again for the BW #1 and the BW #2 before starting transmission at the re-configured bandwidth. Transmission may start upon confirming that a channel is idle.

Specifically, for example, in a process in which a specific node changes a transmission bandwidth, if another node succeeds in LBT and thus performs transmission during a time gap which may occur between an LBT success timing and actual transmission start timing of the specific node, the specific node may not be able to perform transmission even if LBT succeeds. Therefore, the specific node performs short LBT again to guarantee accuracy regarding whether the specific node performs transmission according to a result of the short LBT.

In particular, when a size of a partial bandwidth (for convenience, denoted by BW #X) at which LBT succeeds out of the entire bandwidth is greater than 20 MHz which is a unit of LBT, if a result obtained by performing short LBT shows that LBT succeeds only for a partial bandwidth BW #Y out of BW #X (where BW #X>BW #Y), a transmission bandwidth may be adjusted again hierarchically with the partial bandwidth (i.e., BW #Y) and transmission may start after short LBT is performed. Alternatively, if an LBT result of the BW #Y shows that a channel is in a busy state, Cat. 4 LBT may be performed again from the beginning by updating (or reusing) a CWS used in first LBT of a previous BW #X with respect to a bandwidth (i.e., BW #X) at which the first LBT succeeds. More generally, upon determining that even the partial bandwidth BW #X at which LBT succeeds out of the entire bandwidth is busy after short LBT, it may operate to perform Cat. 4 LBT again. At this time, a bandwidth in which LBT is performed may be the entire bandwidth or may be a transmission node implementation issue. In this case, LBT may be performed by updating (or reusing) a CWS when performing the first LBT.

For example, subsequent to the example above, when short LBT in unit of 20 MHz is performed again for the BW #1 and the BW #2 but LBT succeeds for the BW #1 and fails for the BW #2, a transmission bandwidth may be re-configured again to the BW #1, and transmission may start upon confirming that a channel is idle after performing short LBT. Alternatively, when a short LBT result shows that the channel is busy even for any one of the BW #1 and the BW #2, Cat. 4 LBT may start again by updating (or reusing) the existing CWS at the entire bandwidth of 80 MHz.

In addition, when a time gap is required even in the middle of transmission being performed in practice, the proposed method above may be applied. An exemplary embodiment in which the gap is required even in the middle of transmission may be a method of performing LBT by applying the proposed method during a time gap, which occurs when changing to a sub-band RF band after a corresponding duration while performing transmission (in the meantime, preparing for signal processing involved in the RF change) by maintaining a wideband RF bandwidth without an RF change for an initial specific duration (e.g., X-symbol or 1-slot), and subsequently performing the remaining transmission. Herein, if the time gap is within a specific time, it may be excluded from the application of the proposed method.

[Proposed Method #15] CWS adjustment method based on HARQ-ACK corresponding to a PDSCH overlapping with one or more LBT bandwidths when the LBT bandwidth is defined as a basic frequency-axis resource unit at which a BS adjusts CWS (in this case, HARQ-ACK may imply CBG-unit HARQ-ACK in which (re)transmission in unit of code block group (CBG) is configured).

That is, unlike the existing CWS adjustment based on an NACK ratio in unit of transport blocks, since retransmission in unit of CBG is introduced in NR, there is a need to consider CWS adjustment based on the NACK ratio in unit of CBG.

Figure 16:
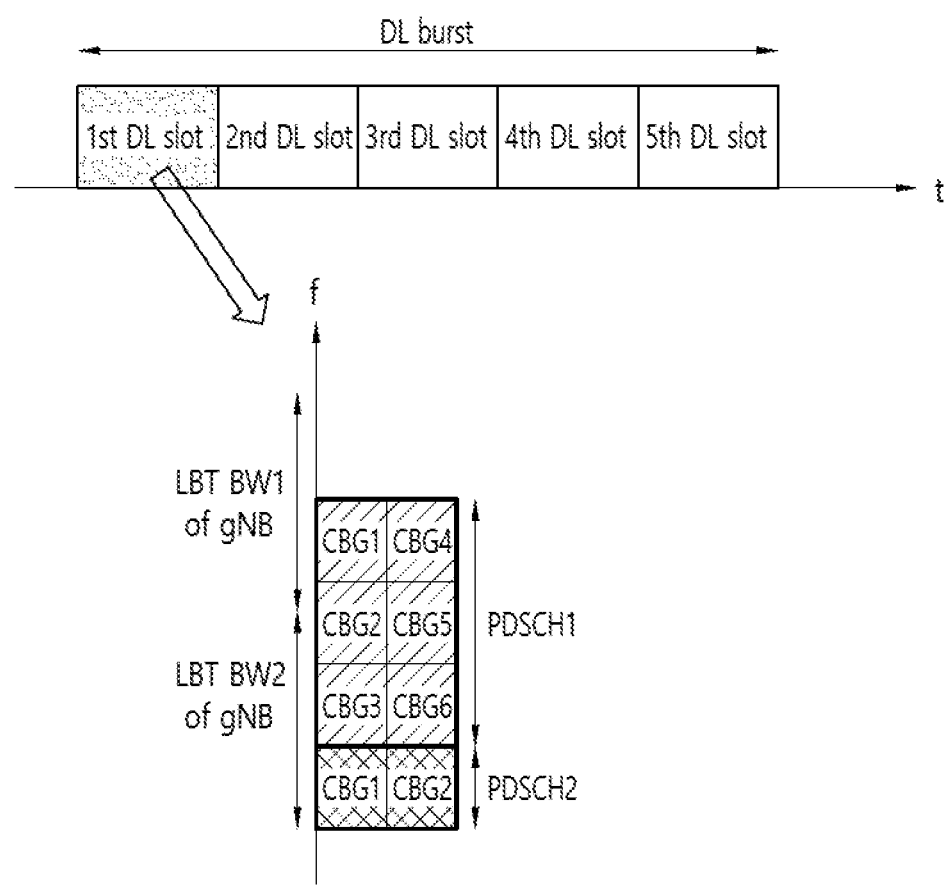
FIG. 16 is for describing CWS adjustment based on NACK in unit of CBG.

FIG. 16 is for describing CWS adjustment based on NACK in unit of CBG.

Referring to FIG. 16, an LBT BW 1 and LBT BW 2 of a gNB are shown, and a PDSCH 1 is scheduled across the LBT BW1 and the LBT BW 2, and a PDSCH 2 is scheduled only for the LBT BW 2. In this case, a CWS adjustment method for the PDSCH 1 may be a problem.

Specifically, a CWS adjustment method based on NACK in unit of CBG may be considered. Alternatively, in case of the PDSCH 1 of FIG. 16, similarly to the CBG 1 to the CBG 6, NACK of all CBGs in one transport block may be considered as one NACK, and CWS adjustment based thereon may be considered.

Herein, the following options may be considered when a specific CBG in a scheduled PDSCH overlaps with a plurality of LBT bandwidths.

Option 1: Method of using an HARQ-ACK feedback result of CBG in CWS adjustment of a plurality of LBT bandwidths Specifically, referring to FIG. 16, for example, among CBGs 1 to 6 of a PDSCH 1, the CBG 1 and the CBG 4 are included in an LBT BW 1, and the CBG 3 and the CBG 6 are included in the LBT BW 2, whereas the CBG 2 and the CBG 5 are across the LBT BW 1 and the LBT BW 2. Herein, according to the option 1, NACK for each of the CBG 2 and the CBG 5 may be used in CWS adjustment for both the LBT BW 1 and the LBT BW 2.

Option 2: Method in which an HARQ-ACK feedback result is used only in CWS adjustment of an LBT bandwidth having a greater proportion of a downlink resource scheduled for the CBG (in case of the same proportion, it may be used only in CWS adjustment of a specific LBT BW indicated through a pre-agreed method or a higher layer signal (e.g., RRC signaling) or a dynamic control signal (e.g., DCI).

Specifically, referring to FIG. 16, for example, there may be a case where resources for a CBG 2 and a CBG 5 are allocated respectively to the LBT BW 1 with a ratio of 40% and to the LBT BW 2 with a ratio of 60%. In this case, according to the option 2, NACK for the CBG 2 and the CBG 5 may be used only in CWS adjustment for the LBT BW 2 to which resources are allocated with a higher ratio.

That is, as shown in FIG. 16, a case where a BS schedules a PDSCH that can overlap with a plurality of LBT BWs may be considered when the BS is configured with a BWP for performing LBT in unit of 20 MHz such as the LBT BW 1 and the LBT BW 2, and a bandwidth of a BWP of the UE includes two LBT BWs of the BS.

Herein, if this PDSCH is configured with (re)transmission in unit of CBG, as shown in FIG. 16, the PDSCH 1 and the PDSCH 2 may respectively include 6 CBGs and 2 CBGs. If each of CBGs scheduled for a first slot of a DL burst (hereinafter, a reference DL resource) exits only within one LBT BW of the BS, HARQ-ACK feedback information for a corresponding CBG may be applied only for CWS adjustment of an LBT BW including the CBG. That is, since HARQ-ACK for the CBGs 1 and 4 constituting the PDSCH 1 is used in CWS adjustment of the LBT BW 1 and CBGs 3 and 6 of the PDSCH 1 and CBGs 1 and 2 of the PDSCH 2 are included in the LBT BW 2, HARQ-ACK of corresponding CBGs may be used only in CWS adjustment of an LBT BW thereof. However, since the CBGs 2 and 5 constituting the PDSCH are scheduled by overlapping with the LBT BW1 and LBT BW 2 of the BS, CWS adjustment may be performed as in the proposed method (1) or (2).

[Proposed Method #16] CWS adjustment method based on a decoding result of a PUSCH overlapping with one or more LBT BWs, when a basic frequency-axis resource unit in which a UE adjusts a CWS is defined as an LBT BW (in this case, the decoding result may be assumed through CBG retransmission scheduling of a PUSCH in which CBG-unit (re)transmission is configured or new data scheduling).

Herein, the following options may be considered when a specific CBG in a scheduled PUSCH overlaps with a plurality of LBT bandwidths.

Option 1: Method of using a CBG decoding result in CWS adjustment of a plurality of overlapping LBT bandwidths Option 2: Method of using a CBG decoding result in CWS adjustment of some reference LBT bandwidths Meanwhile, the reference LBT bandwidth may be configured or indicated through a dynamic control signal (e.g., DCI) or a higher layer signal (e.g., RRC signaling) of a BS, or may be used in CWS adjustment of an LBT bandwidth having a greater proportion of an uplink (UL) resource among LBT bandwidths scheduled for a CBG indicated to be transmitted.

However, the aforementioned method may be applicable under the premise that, when a BS fails in reception of specific CBG(s), retransmission of CBG(s) is always indicated in next retransmission scheduling. This principle may be applied to time-advanced CBG index(es) of all slots or to a first slot of a UL burst considered by the BS.

Figure 17:
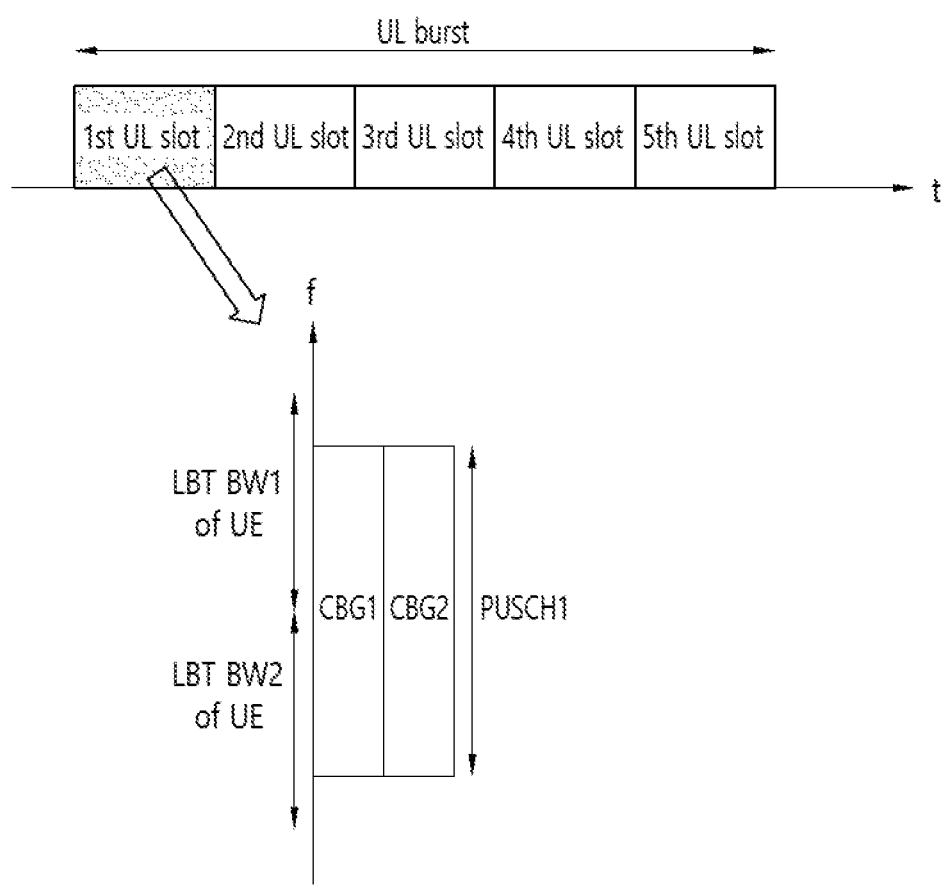
FIG. 17 is an example for illustrating CWS adjustment based on NACK in unit of CBG.

FIG. 17 is an example for illustrating CWS adjustment based on NACK in unit of CBG.

For example, as shown in FIG. 17, when a PUSCH 1 in which (re)transmission in unit of CBG is configured is scheduled in a first slot of an uplink (UL) burst and is configured as a reference UL resource (orange), according to a decoding result of the PUSCH 1 of a BS, new data may be scheduled by sending a UL grant to a UE after 3 ms or 4 ms or retransmission of some or all CBGs constituting the PUSCH 1 may be indicated.

In FIG. 17, since the PUSCH 1 is scheduled by overlapping with an LBT BW 1 and LBT BW 2 of a UE, a CWS of each LBT BW may be adjusted as in the [Proposed Method #16] according to the decoding result of the PUSCH 1.

If scheduling of retransmission for some or all CBGs of the PUSCH 1 is indicated through the UL grant (e.g., code block group transmission information (CBGTI)), CBGs scheduled for corresponding retransmission may be assumed to be NACK, and the UE may perform CBW adjustment of an LBT BW scheduled for a corresponding CBG. Regarding CWS adjustment for each LBT BW of the UE, if a CBG in which retransmission is indicated is scheduled only for a specific LBT BW as in the [Proposed Method #4], the CWS adjustment may be applied only to the LBT bandwidth. If the CBG overlaps with two LBT BWs, it may be used for CWS adjustment of both of the two LBT BWs or may be used only for CWS adjustment of an LBT BW having a greater proportion of a UL resource.

Meanwhile, when new data is scheduled instead of indicating retransmission through a UL grant, the PUSCH 1 may be successfully decoded. Thus, ACK may be assumed, and a CWS of each LBT BW may be initialized.

[Proposed Method #17] Method of adjusting and managing individual CWS hierarchically for each LBT-unit BW (e.g., multiples of 20 MHz) at which LBT is performed Compared to the LTE system, NR supports a wider bandwidth operation. Therefore, a wideband (>20 MHz) may be divided into a plurality of sub-bands in unit of 20 MHz so that LBT is performed and CWS adjustment/management is achieved in each sub-band. Alternatively, when performing channel access of multi-carrier as in LAA, LBT may be performed and CWS may be managed in unit of 20 MHz by selecting a specific representative carrier.

Figure 18:
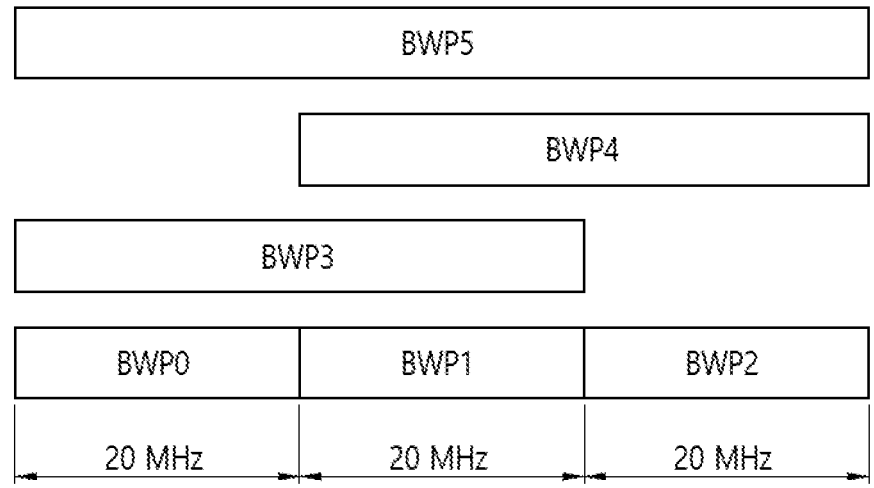
FIG. 18 is for describing an example of applying the [Proposed Method #17].

FIG. 18 is for describing an example of applying the [Proposed Method #17].

When a sub-band LBT (e.g., 20 MHz) and a wideband LBT (>20 MHz) are both supported and can be used through two-LBT-type semi-static or dynamic switching in an NR unlicensed band, as shown in FIG. 18, it may be effective to adjust and manage an individual CWS hierarchically for each LBT-unit bandwidth (e.g., multiples of 20 MHz).

For example, when 6 BWPs (a BWP 0 to a BWP 5) of FIG. 18 are configured, the BWP 3 includes the BWP 0 and the BWP 1, the BWP 4 includes the BWP 1 and the BWP 2, and the BWP 5 includes the remaining parts. In this situation, a result obtained by performing sub-band LBT in unit of 20 MHz (e.g., a result obtained by performing LBT of the BWP 0) may be considered for CWS adjustment of a corresponding BWP, and may also be considered for CWS adjustment of a BWP (e.g., the BWP 3 including the BWP 0, and the BWP 5) including the corresponding BWP. Accordingly, when the CWS is updated to a value one level higher in the BWP 0, the CWS of the BWP 3 and the BWP 5 is also updated to a value one level higher.

In addition, when wideband LBT is performed in the BWP 3 or the BWP 5, LBT may be performed with a previously updated CWS. When the wideband LBT succeeds and thus the CWS of the BWP 3 is initialized, the CWS of the BWP 0 and/or the BWP 1 may be initialized together according to a configuration or may not be initialized.

Meanwhile, the present disclosure is not limited to direct communication between UEs but is also applicable in an uplink or a downlink. In this case, a BS or a relay node or the like may use the proposed method.

Examples for the aforementioned proposed scheme can be included as one of implementation methods of the present disclosure, and thus can be apparently regarded as a sort of proposed methods. In addition, although the aforementioned proposed schemes can be independently implemented, it is also possible to be implemented by combining (or merging) some proposed schemes. A rule may be defined such that information on whether to apply the proposed methods (or information on rules of the proposed methods) is reported by a BS to a UE or by a transmitting UE to a receiving UE through a pre-defined signal (e.g., a physical layer signal or a higher layer signal).

Figure 19:
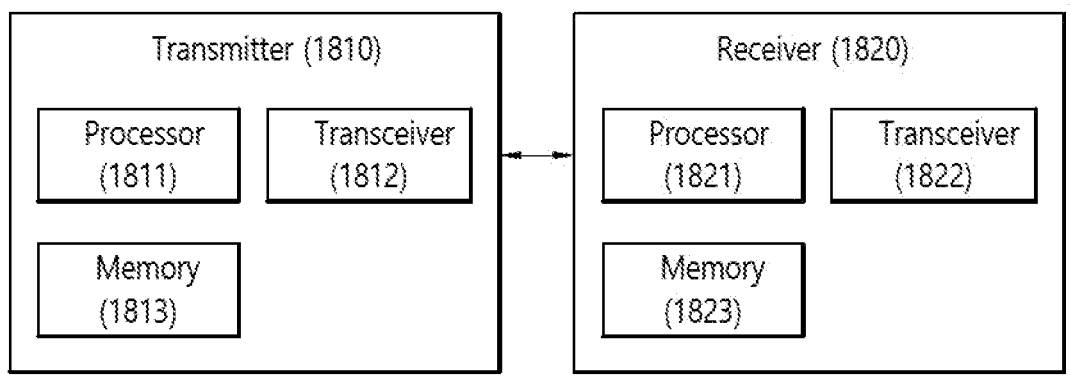
FIG. 19 is a block diagram showing components of a transmission device 1810 and a reception device 1820 which perform the present disclosure.

FIG. 19 is a block diagram showing components of a transmission device 1810 and a reception device 1820 which perform the present disclosure. Herein, each of the transmission device and the reception device may be a BS or a UE.

The transmission device 1810 and the reception device 1820 may respectively include transceivers 1812 and 1822 capable of transmitting or receiving radio signals carrying information and/or data, signals, messages, and the like, memories 1813 and 1823 storing various types of information related to communication in a wireless communication system, and processors 1811 and 1821 connected to components such as the transceivers 1812 and 1822 and the memories 1813 and 1823 and configured to control the memories 1813 and 1823 and/or the transceivers 1812 and 1822 such that the corresponding devices perform at least one of the aforementioned embodiments of the present disclosure. Herein, a transmitter/receiver may be called a transceiver.

The memories 1813 and 1823 may store programs for processing and control of the processors 1811 and 1821 and temporarily store input/output information. The memories 1813 and 1823 may be used as buffers.

The processors 1811 and 1821 generally control overall operations of various modules in the transmission device and the reception device. Particularly, the processors 1811 and 1821 may execute various control functions for performing the present disclosure. The processors 1811 and 1821 may also be called controllers, microcontrollers, microprocessors, microcomputers, and the like. The processors 1811 and 1821 may be implemented by hardware, firmware, software or a combination thereof. When the present disclosure is implemented using hardware, ASICs (application specific integrated circuits), DSPs (digital signal processors), DSPDs (digital signal processing devices), PLDs (programmable logic devices), FPGAs (field programmable gate arrays), or the like configured to perform the present disclosure may be included in the processors 1811 and 1821. Meanwhile, when the present disclosure is implemented using firmware or software, firmware or software may be configured to include modules, procedures, functions, or the like which perform functions or operations of the present disclosure, and the firmware or software configured to perform the present disclosure may be included in the processors 1811 and 1821 or stored in the memories 1813 and 1823 and driven by the processors 1811 and 1821.

The processor 1811 of the transmission device 1810 may perform predetermined coding and modulation on a signal and/or data which will be transmitted to the outside and then transmit the coded and modulated signal or data to the transceiver 1812. For example, the processor 1811 may generate a codeword by performing demultiplexing, channel coding, scrambling, and modulation on a data string to be transmitted. The codeword may include information equivalent to transport blocks that are data blocks provided by a MAC layer. One transport block (TB) may be coded into one codeword. Each codeword may be transmitted to the reception device through one or more layers. For frequency up-conversion, the transceiver 1812 may include an oscillator. The transceiver 1812 may include one or a plurality of transmission antennas.

A signal processing procedure of the reception device 1820 may be reverse to the signal processing procedure of the transmission device 1810. The transceiver 1822 of the reception device 1820 may receive radio signals transmitted from the transmission device 1810 under the control of the processor 1821. The transceiver 1822 may include one or a plurality of reception antennas. The transceiver 1822 may restore each signal received through the reception antenna to a baseband signal by performing frequency down-conversion. The transceiver 1822 may include an oscillator for frequency down-conversion. The processor 1821 may restore data intended to be transmitted by the transmission device 1810 by performing decoding and demodulation on radio signals received through the reception antenna.

The transceivers 1812 and 1822 may include one or a plurality of antennas. The antennas may serve to transmit signals processed by the transceivers 1812 and 1822 to the outside or receive external radio signals and transmit the radio signals to the transceivers 1812 and 1822 according to an embodiment under the control of the processors 1811 and 1821. The antennas may also be called antenna ports. Each antenna may correspond to one physical antenna or may be configured by a combination of two or more physical antennas. A signal transmitted from each antenna cannot be decomposed any more by the reception device 1820. A reference signal (RS) transmitted in association with an antenna defines the antenna from a perspective of the reception device 1820 and enables the reception device 1820 to perform channel estimation for the antenna irrespective of whether a channel is a single radio channel from a physical antenna or a composite channel from a plurality of physical antenna elements including the antenna. That is, an antenna may be defined such that a channel carrying symbols on the antenna can be derived from a channel carrying other symbols on the same antenna. A transceiver which supports a multi-input multi-output (MIMO) function for transmitting/receiving data using a plurality of antennas may be connected to two or more antennas.

Figure 20:
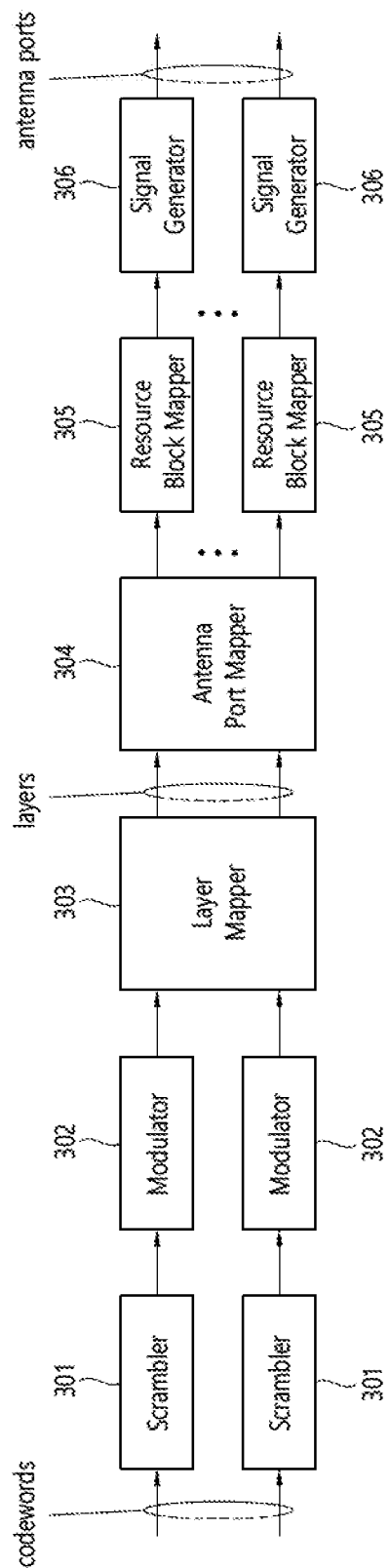
FIG. 20 shows an example of a signal processing module structure in the transmission device 1810.

FIG. 20 shows an example of a signal processing module structure in the transmission device 1810. Herein, signal processing may be performed by a processor of a BS/UE such as the processors 1811 and 1821 of FIG. 20.

Referring to FIG. 20, the transmission device 1810 in the UE or the BS may include a scrambler 301, a modulator 302, a layer mapper 303, an antenna port mapper 304, a resource block mapper 305 and a signal generator 306.

The transmission device 1810 may transmit one or more codewords. Coded bits in each codeword are scrambled by the scrambler 301 and transmitted on a physical channel. A codeword may also be referred to as a data string and may be equivalent to a transport block that is a data block provided by a MAC layer.

The scrambled bits are modulated into complex-valued modulation symbols by the modulator 302. The modulator 302 may modulate the scrambled bits according to a modulation scheme and arrange the scrambled bits as complex-valued symbols representing positions on a signal constellation. The modulation scheme is not limited, and m-phase shift keying (m-PSK) or m-quadrature amplitude modulation (m-QAM) may be used to module the coded data. The modulator may also be referred to as a modulation mapper.

The complex-valued modulation symbols may be mapped to one or more transport layers by the layer mapper 303. The complex-valued modulation symbols on the layers may be mapped by the antenna port mapper 304 for transmission on antenna ports.

The resource block mapper 305 may map complex-valued modulation symbols for respective antenna ports to appropriate resource elements in a virtual resource block allocated for transmission. The resource block mapper may map the virtual resource block to a physical resource block according to an appropriate mapping scheme. The resource block mapper 305 may allocate the complex-valued modulation symbols for the respective antenna ports to appropriate subcarriers and multiplex the same according to a user.

The signal generator 306 may modulate the complex-valued modulation symbols for the respective antenna ports, that is, antenna-specific symbols according to a specific modulation scheme, for example, orthogonal frequency division multiplexing (OFDM) to generate a complex-valued time domain OFDM symbol signal. The signal generator may perform inverse fast Fourier transform (IFFT) on the antenna-specific symbols, and a cyclic prefix (CP) may be inserted into time domain symbols on which IFFT has been performed. OFDM symbols are subjected to digital-toanalog conversion, frequency up-conversion, and the like and transmitted to a reception device through respective transmission antennas. The signal generator may include an IFFT module, a CP insertion device, a digital-to-analog converter (DAC), a frequency uplink converter, and the like.

Figure 21:
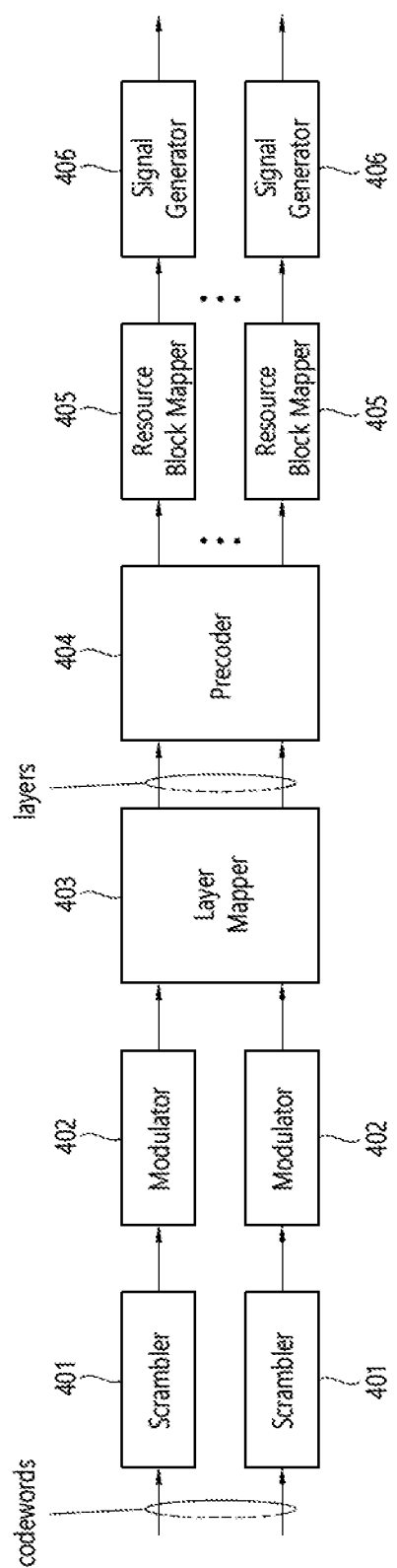
FIG. 21 shows another example of the signal processing module structure in the transmission device 1810.

FIG. 21 shows another example of the signal processing module structure in the transmission device 1810. Herein, signal processing may be performed by a processor of a UE/BS such as the processors 1811 and 1821 of FIG. 19.

Referring to FIG. 21, the transmission device 1810 in the UE or the BS may include a scrambler 401, a modulator 402, a layer mapper 403, a precoder 404, a resource block mapper 405, and a signal generator 406.

For a codeword, the transmission device 1810 may scramble coded bits in the codeword through the scrambler 401 and then transmit the scrambled bits through a physical channel.

The scrambled bits are modulated into complex-valued modulation symbols by the modulator 402. The modulator may modulate the scrambled bits according to a predetermined modulation scheme and arrange the scrambled bits as complex-valued symbols representing positions on a signal constellation. The modulation scheme is not limited, and pi/2-binary phase shift keying (pi/2-BPSK), m-phase shift keying (m-PSK) or m-quadrature amplitude modulation (m-QAM) may be used to modulate the coded data.

The complex-valued modulation symbols may be mapped to one or more transport layers by the layer mapper 403.

The complex-valued modulation symbols on the layers may be precoded by the precoder 404 for transmission through antenna ports. Herein, the precoder may perform precoding after performing transform precoding for the complex-valued modulation symbols. Alternatively, the precoder may perform precoding without performing transform precoding. The precoder 404 may process the complex-valued modulation symbols according to MIMO using multiple transmission antennas to output antenna-specific symbols and distribute the antenna-specific symbols to the corresponding resource block mapper 405. An output z of the precoder 404 may be obtained by multiplying output y of the layer mapper 403 by an NxM precoding matrix W. Herein, N is the number of antenna ports, and M is the number of layers.

The resource block mapper 405 maps complex-valued modulation symbols for respective antenna ports to appropriate resource elements in a virtual resource block allocated for transmission.

The resource block mapper 405 may allocate the complex-valued modulation symbols to appropriate subcarriers and multiplex the same according to a user.

The signal generator 406 may modulate the complex-valued modulation symbols according to a specific modulation scheme, for example, OFDM to generate a complex-valued time domain OFDM symbol signal. The signal generator 406 may perform inverse fast Fourier transform (IFFT) on the antenna-specific symbols, and a cyclic prefix (CP) may be inserted into time domain symbols on which IFFT has been performed. OFDM symbols are subjected to digital-to-analog conversion, frequency up-conversion, and the like and transmitted to a reception device through respective transmission antennas. The signal generator 406 may include an IFFT module, a CP insertion device, a digital-to-analog converter (DAC), a frequency uplink converter, and the like.

A signal processing procedure of a reception device 1820 may be reverse to the signal processing procedure of the transmission device. Specifically, the processor 1821 of the transmission device 10 decodes and modulates a radio signal received from the outside through antenna ports of the transceiver 1822. The reception device 1820 may include multiple reception antennas, and signals received through the reception antennas are restored into baseband signals and then restored into data strings intended to be transmitted by the transmission device 10 through multiplexing and MIMO demodulation. The reception device 1820 may include a signal restoration device for restoring a received signal into a baseband signal, a multiplexer for combining and multiplexing received signals, and a channel demodulator for demodulating multiplexed signal strings into corresponding codewords. The signal restoration device, the multiplexer, and the channel demodulator may be configured as an integrated module for executing functions thereof or as independent modules. More specifically, the signal restoration device may include an analog-to-digital converter (ADC) for converting an analog signal into a digital signal, a CP remover for removing a CP from the digital signal, an FFT module for applying fast Fourier transform (FFT) to the CP-removed signal to output frequency domain symbols, and a resource element demapper/equalizer for restoring the frequency domain symbols into antenna-specific symbols. The antenna-specific symbols are restored into a transport layer through the multiplexer, and the transport layer is restored into a codeword intended to be transmitted by the transmission device through the channel demodulator.

Figure 22:
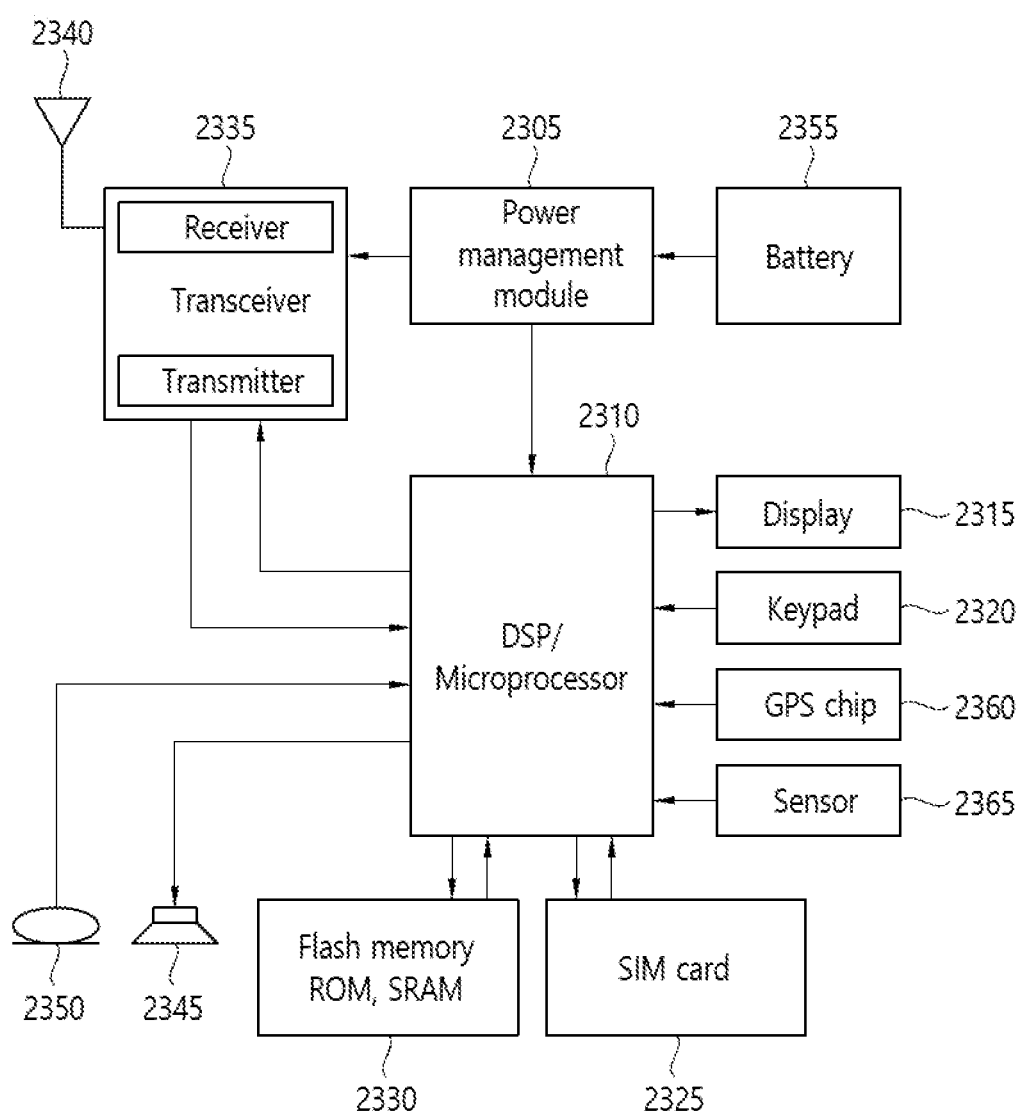
FIG. 22 shows an example of a wireless communication device according to an implementation example of the present disclosure.

FIG. 22 shows an example of a wireless communication device according to an implementation example of the present disclosure.

Referring to FIG. 22, the wireless communication device, for example, a UE may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345, and a microphone 2350. A plurality of antennas and a plurality of processors may be provided.

The processor 2310 may implement functions, procedures, and methods described in the present specification. The processor 2310 of FIG. 21 may be the processors 1811 and 1821 of FIG. 19.

The memory 2330 is connected to the processor 2310 and stores information related to operation of the processor. The memory may be located inside or outside the processor and connected to the processor through various techniques such as wired connection and wireless connection. The memory 2330 of FIG. 21 may be the memories 1813 and 1823 of FIG. 19.

A user may input various types of information such as telephone numbers using various techniques such as pressing buttons of the keypad 2320 and activating sound using the microphone 2350. The processor 2310 may receive user information, process the user information, and execute an appropriate function such as making a call using an input telephone number. In some scenarios, data may be retrieved from the SIM card 2325 or the memory 2330 in order to execute an appropriate function. In some scenarios, the processor 2310 may display various types of information and data on the display 2315 for user convenience.

The transceiver 2335 is connected to the processor 2310 and transmit/receive radio signals such as radio frequency (RF) signals. The processor may control the transceiver in order to start communication or transmit radio signals including various types of information or data such as audio communication data. The transceiver includes a transmitter and a receiver for transmitting and receiving radio signals. The antenna 2340 may facilitate transmission and reception of radio signals. In some implementation examples, when the transceiver receives a radio signal, the transceiver may forward and convert the signal into a baseband frequency for processing by the processor. The processed signal may be processed through various techniques such as conversion into audible or readable information such that it is output through the speaker 2345. The transceiver of FIG. 21 may be the transceivers 1812 and 1822 of FIG. 19.

Although not shown in FIG. 22, the UE may additionally include various components such as a camera and a universal serial bus (USB) port. For example, the camera may be connected to the processor 2310.

FIG. 22 is only one implementation example for the UE, and the implementation example is not limited thereto. It is not necessary for the UE to include all components of FIG. 22. That is, some components, for example, the keypad 2320, the GSP chip 2360, the sensor 2365, and the SIM card may not be essential components, and in this case, they may not be included in the UE.

What is claimed is:

1. A method for adjusting a size of a contention window in a wireless communication system, the method performed by a base station (BS) and comprising:
    transmitting at least one code block group (CBG) for a physical downlink shared channel (PDSCH) to a user equipment (UE) on a frequency bandwidth;
    receiving an acknowledgement/negative-acknowledgement (ACK/NACK) signal for each of the at least one CBG for the PDSCH from the UE; and
    adjusting the size of the contention window based on the ACK/NACK signal,
    wherein based on a first CBG included in the at least one CBG being fully included in a specific frequency band among a plurality of frequency bands, the BS adjusts the size of the contention window for the specific frequency band based on the ACK/NACK signal for the first CBG,
    wherein based on a second CBG included in the at least one CBG overlapping with the plurality of frequency bands, the BS adjusts the size of the contention window for each of the plurality of frequency bands based on the ACK/NACK signal for the second CBG, and
    wherein each of the plurality of frequency bands is a unit for adjusting the size of the contention window.

2. The method of claim 1, wherein the BS performs a channel access procedure on the plurality of frequency bands, and
    wherein the channel access procedure is performed for an unlicensed frequency band.

3. The method of claim 2, wherein the contention window is a counter value used for determining channel occupancy in the channel access procedure.

4. The method of claim 3, wherein the counter value is initially configured to a value greater than or equal to 0 and less than or equal to the size of the contention window.

5. The method of claim 1, wherein the BS adjusts the size of the contention window for each of the plurality of frequency bands based on the ACK/NACK signal, based on each of the plurality of frequency bands overlapping with the frequency bandwidth fully or partially.

6. The method of claim 1, wherein the PDSCH is transmitted through a plurality of time domain resources.

7. The method of claim 6, wherein the ACK/NACK is transmitted per each of the plurality of time domain resources.

8. The method of claim 1, wherein a size for each of the plurality of frequency bands is as same as each other.

9. The method of claim 8, wherein the size is 20 megahertz (MHz).

10. The method of claim 1, wherein the base station is a gNodeB (gNB).

11. A base station (BS) comprising:
    a transceiver; and
    a processor operatively coupled with the transceiver, wherein the processor is configured to:
    transmit at least one code block group (CBG) for a physical downlink shared channel (PDSCH) to a user equipment (UE) on a frequency bandwidth;
    receive an acknowledgement/negative-acknowledgement (ACK/NACK) signal for each of the at least one CBG for the PDSCH from the UE; and
    adjust a size of a contention window based on the ACK/NACK signal,
    wherein based on a first CBG included in the at least one CBG being fully included in a specific frequency band among a plurality of frequency bands, the BS adjusts the size of the contention window for the specific frequency band based on the ACK/NACK signal for the first CBG,
    wherein based on a second CBG included in the at least one CBG overlapping with the plurality of frequency bands, the BS adjusts the size of the contention window for each of the plurality of frequency bands based on the ACK/NACK signal for the second CBG, and
    wherein each of the plurality of frequency bands is a unit for adjusting the size of the contention window.

12. A non-transitory computer readable memory storing instructions that, based on being executed by a processor, control a base station (BS) to perform operations for adjusting a size of a contention window in a wireless communication system, the operations comprising:
    transmitting at least one code block group (CBG) for a physical downlink shared channel (PDSCH) to a user equipment (UE) on a frequency bandwidth;
    receiving an acknowledgement/negative-acknowledgement (ACK/NACK) signal for each of the at least one CBG for the PDSCH from the UE; and
    adjusting the size of the contention window based on the ACK/NACK signal,
    wherein based on a first CBG included in the at least one CBG being fully included in a specific frequency band among a plurality of frequency bands, the BS adjusts the size of the contention window for the specific frequency band based on the ACK/NACK signal for the first CBG,
    wherein based on a second CBG included in the at least one CBG overlapping with the plurality of frequency bands, the BS adjusts the size of the contention window for each of the plurality of frequency bands based on the ACK/NACK signal for the second CBG, and
    wherein each of the plurality of frequency bands is a unit for adjusting the size of the contention window.

* * * * *